(12) United States Patent
Mendell

(10) Patent No.: US 12,167,099 B2
(45) Date of Patent: *Dec. 10, 2024

(54) SYSTEMS AND METHODS FOR GENERATING NOTIFICATION INTERFACES SYNCHRONIZED WITH BROADCAST EVENTS AND LOCAL INTERACTIONS

(71) Applicant: DK Crown Holdings Inc., Boston, MA (US)

(72) Inventor: Jordan Mendell, Boca Raton, FL (US)

(73) Assignee: DK Crown Holdings Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/408,359

(22) Filed: Jan. 9, 2024

(65) Prior Publication Data

US 2024/0155202 A1 May 9, 2024

Related U.S. Application Data

(63) Continuation of application No. 17/943,930, filed on Sep. 13, 2022, now Pat. No. 11,895,374, which is a
(Continued)

(51) Int. Cl.
*H04N 21/488* (2011.01)
*G07F 17/32* (2006.01)
(Continued)

(52) U.S. Cl.
CPC ..... *H04N 21/4882* (2013.01); *G07F 17/3211* (2013.01); *G07F 17/3237* (2013.01);
(Continued)

(58) Field of Classification Search
CPC .......... H04N 21/4882; H04N 21/4518; H04N 21/2187; H04N 21/2353; H04N 21/25808;
(Continued)

(56) References Cited

U.S. PATENT DOCUMENTS 5,830,068 A 11/1998 Brenner et al.
6,735,487 B1 5/2004 Marshall et al.
(Continued)

FOREIGN PATENT DOCUMENTS

EP 1 484 723 A2 12/2004
EP 4 024 322 A1 7/2022

OTHER PUBLICATIONS

Final Office Action on U.S. Appl. No. 17/516,150 dated Mar. 10, 2023.
(Continued)

*Primary Examiner* — Nicholas T Corbo
(74) *Attorney, Agent, or Firm* — Foley & Lardner LLP

(57) ABSTRACT

Systems and methods for generating notification interfaces synchronized with broadcast events and local interactions are disclosed. The system can receive a plurality of interactions corresponding to a conditional event opportunity of a live event from a respective plurality of client devices, and identify a broadcast receiver device that is presenting a broadcast of the live event. The system can generate instructions for a broadcast receiver device that causes an application executing on the broadcast receiver device to display one or more content items corresponding to the conditional event opportunity. The system can transmit the instructions to the broadcast receiver device to cause the application to display the one or more content items with the broadcast of the live event.

20 Claims, 9 Drawing Sheets

Related U.S. Application Data continuation of application No. 17/516,200, filed on Nov. 1, 2021, now Pat. No. 11,445,264.

(60) Provisional application No. 63/273,580, filed on Oct. 29, 2021.

(51) Int. Cl.
| | |
|---|---|
| *H04N 21/2187* | (2011.01) |
| *H04N 21/235* | (2011.01) |
| *H04N 21/258* | (2011.01) |
| *H04N 21/262* | (2011.01) |
| *H04N 21/414* | (2011.01) |
| *H04N 21/431* | (2011.01) |
| *H04N 21/45* | (2011.01) |
| *H04N 21/458* | (2011.01) |
| *H04N 21/475* | (2011.01) |
| *H04N 21/478* | (2011.01) |
| *H04N 21/6543* | (2011.01) |
| *H04N 21/6547* | (2011.01) |
| *H04N 21/81* | (2011.01) |

(52) U.S. Cl.
CPC ..... *G07F 17/3288* (2013.01); *H04N 21/2187* (2013.01); *H04N 21/2353* (2013.01); *H04N 21/25808* (2013.01); *H04N 21/26208* (2013.01); *H04N 21/2625* (2013.01); *H04N 21/41407* (2013.01); *H04N 21/4316* (2013.01); *H04N 21/4518* (2020.08); *H04N 21/4524* (2013.01); *H04N 21/4532* (2013.01); *H04N 21/458* (2013.01); *H04N 21/4753* (2013.01); *H04N 21/478* (2013.01); *H04N 21/6543* (2013.01); *H04N 21/6547* (2013.01); *H04N 21/8126* (2013.01); *H04N 21/8133* (2013.01)

(58) Field of Classification Search
CPC ......... H04N 21/26208; H04N 21/2625; H04N 21/41407; H04N 21/4316; H04N 21/4524; H04N 21/4532; H04N 21/458; H04N 21/4753; H04N 21/478; H04N 21/6543; H04N 21/6547; H04N 21/8126; H04N 21/8133; G07F 17/3211; G07F 17/3237; G07F 17/3288

See application file for complete search history.

(56) References Cited

U.S. PATENT DOCUMENTS

| | | | |
|---|---|---|---|
| 7,904,924 | B1 | 3/2011 | Heer et al. |
| 8,538,563 | B1 | 9/2013 | Barber |
| 10,664,138 | B2 | 5/2020 | Carney et al. |
| 11,190,736 | B2 | 11/2021 | Kawakami et al. |
| 11,217,067 | B1 | 1/2022 | Huke et al. |
| 2005/0005291 | A1 | 1/2005 | Mcginley |
| 2007/0157281 | A1 | 7/2007 | Ellis et al. |
| 2008/0066111 | A1 | 3/2008 | Ellis et al. |
| 2008/0112690 | A1 | 5/2008 | Shahraray et al. |
| 2008/0148317 | A1 | 6/2008 | Opaluch |
| 2009/0082095 | A1 | 3/2009 | Walker et al. |
| 2009/0133051 | A1 | 5/2009 | Hildreth |
| 2009/0158374 | A1 | 6/2009 | Malaure et al. |
| 2009/0183178 | A1 | 7/2009 | Imai et al. |
| 2009/0288118 | A1 | 11/2009 | Chang |
| 2010/0041482 | A1 | 2/2010 | Kumar et al. |
| 2010/0058423 | A1 | 3/2010 | Yaussy et al. |
| 2010/0144426 | A1 | 6/2010 | Winner et al. |
| 2010/0262986 | A1 | 10/2010 | Adimatyam et al. |
| 2011/0022471 | A1 | 1/2011 | Brueck et al. |
| 2011/0069940 | A1 | 3/2011 | Shimy et al. |
| 2011/0078717 | A1 | 3/2011 | Drummond et al. |
| 2011/0086699 | A1 | 4/2011 | Allen et al. |
| 2012/0033943 | A1 | 2/2012 | Klappert et al. |
| 2013/0002716 | A1 | 1/2013 | Walker et al. |
| 2013/0027613 | A1 | 1/2013 | Kim et al. |
| 2013/0173765 | A1 | 7/2013 | Korbecki |
| 2013/0179925 | A1 | 7/2013 | Woods et al. |
| 2013/0225298 | A1 | 8/2013 | Hamlin et al. |
| 2013/0247120 | A1 | 9/2013 | Milgramm |
| 2013/0282421 | A1 | 10/2013 | Graff et al. |
| 2014/0036152 | A1 | 2/2014 | Jackson et al. |
| 2014/0062696 | A1 | 3/2014 | Packard et al. |
| 2014/0068692 | A1 | 3/2014 | Archibong et al. |
| 2014/0129570 | A1 | 5/2014 | Johnson |
| 2014/0130079 | A1 | 5/2014 | Arora et al. |
| 2014/0201769 | A1 | 7/2014 | Neumeier et al. |
| 2014/0282721 | A1 | 9/2014 | Kuncl et al. |
| 2015/0070516 | A1 | 3/2015 | Shoemake et al. |
| 2015/0163547 | A1 | 6/2015 | Whitten |
| 2015/0172338 | A1 | 6/2015 | Moran et al. |
| 2016/0088352 | A1 | 3/2016 | Agarwal et al. |
| 2016/0227281 | A1 | 8/2016 | Abuelsaad et al. |
| 2016/0337702 | A1 | 11/2016 | Klappert et al. |
| 2017/0034594 | A1 | 2/2017 | Francis et al. |
| 2017/0064378 | A1 | 3/2017 | Webster et al. |
| 2017/0064396 | A1 | 3/2017 | Yun et al. |
| 2017/0070769 | A1 | 3/2017 | Bostick et al. |
| 2018/0048936 | A1 | 2/2018 | Gupta et al. |
| 2018/0060439 | A1 | 3/2018 | Kula et al. |
| 2018/0108380 | A1 | 4/2018 | Packard et al. |
| 2018/0214772 | A1 | 8/2018 | Walsh |
| 2019/0205839 | A1 | 7/2019 | Dotan-Cohen et al. |
| 2019/0236905 | A1 | 8/2019 | Washington et al. |
| 2019/0268663 | A1 | 8/2019 | Fischer |
| 2019/0349638 | A1 | 11/2019 | Baek et al. |
| 2019/0362601 | A1 | 11/2019 | Kline et al. |
| 2019/0384469 | A1 | 12/2019 | Lo et al. |
| 2020/0213678 | A1 | 7/2020 | Pleiman |
| 2020/0245017 | A1 | 7/2020 | Ganschow et al. |
| 2020/0252664 | A1 | 8/2020 | Weinraub |
| 2020/0294364 | A1 | 9/2020 | Nelson et al. |
| 2020/0357246 | A1 | 11/2020 | Nelson et al. |
| 2021/0031105 | A1 | 2/2021 | Ganschow et al. |
| 2021/0076099 | A1 | 3/2021 | Ganschow et al. |
| 2021/0217269 | A1 | 7/2021 | Huke et al. |
| 2022/0103905 | A1 | 3/2022 | Montgomery et al. |
| 2022/0114339 | A1 | 4/2022 | Aher et al. |
| 2022/0157127 | A1 | 5/2022 | Tadepalli et al. |
| 2022/0309873 | A1 | 9/2022 | Russ et al. |
| 2022/0321951 | A1 | 10/2022 | Chandrashekar et al. |
| 2022/0377427 | A1 | 11/2022 | Montgomery et al. |

OTHER PUBLICATIONS

Final Office Action on U.S. Appl. No. 17/516,150 dated May 27, 2022.
Final Office Action on U.S. Appl. No. 17/976,097 dated Jul. 10, 2023.
Final Office Action on U.S. Appl. No. 17/976,107 dated Aug. 11, 2023.
Final Office Action on U.S. Appl. No. 17/976,130 dated Jun. 1, 2023.
Final Office Action on U.S. Appl. No. 17/976,141 dated Jul. 13, 2023.
Non-Final Office Action on U.S. Appl. No. 17/516,150 dated Jan. 28, 2022.
Non-Final Office Action on U.S. Appl. No. 17/516,134 dated Feb. 1, 2022.
Non-Final Office Action on U.S. Appl. No. 17/516,150 dated Nov. 18, 2022.
Non-Final Office Action on U.S. Appl. No. 17/516,197 dated Jan. 13, 2022.
Non-Final Office Action on U.S. Appl. No. 17/516,200 dated Dec. 21, 2021.
Non-Final Office Action on U.S. Appl. No. 17/947,444 dated Oct. 11, 2023.
Non-Final Office Action on U.S. Appl. No. 17/976,097 dated Mar. 2, 2023.

(56) References Cited

OTHER PUBLICATIONS

Non-Final Office Action on U.S. Appl. No. 17/976,107 dated Mar. 28, 2023.
Non-Final Office Action on U.S. Appl. No. 17/976,107 dated Jan. 5, 2024.
Non-Final Office Action on U.S. Appl. No. 17/976,120 dated Jan. 25, 2023.
Non-Final Office Action on U.S. Appl. No. 17/976,130 dated Feb. 2, 2023.
Non-Final Office Action on U.S. Appl. No. 17/976,130 dated Sep. 14, 2023.
Non-Final Office Action on U.S. Appl. No. 17/976,141 dated Mar. 16, 2023.
Non-Final Office Action on U.S. Appl. No. 17/976,141 dated Nov. 29, 2023.
Notice of Allowance on U.S. Appl. No. 17/516,134 dated Jun. 6, 2022.
Notice of Allowance on U.S. Appl. No. 17/516,150 dated Sep. 21, 2023.
Notice of Allowance on U.S. Appl. No. 17/516,197 dated May 6, 2022.
Notice of Allowance on U.S. Appl. No. 17/516,200 dated Apr. 27, 2022.
Notice of Allowance on U.S. Appl. No. 17/943,930 dated Oct. 17, 2023.
Notice of Allowance on U.S. Appl. No. 17/976,097 dated Nov. 7, 2023.
Notice of Allowance on U.S. Appl. No. 17/976,120 dated May 9, 2023.
Final Office Action on U.S. Appl. No. 17/947,444 dated Apr. 3, 2024.
Final Office Action on U.S. Appl. No. 17/976,141 dated Mar. 12, 2024.
Notice of Allowance on U.S. Appl. No. 17/976,130 dated Jan. 26, 2024.
Final Office Action on U.S. Appl. No. 17/976,107 dated May 8, 2024.
Non-Final Office Action on U.S. Appl. No. 17/953,105 dated Jul. 5, 2024.
Notice of Allowance on U.S. Appl. No. 17/976,141 dated Jul. 17, 2024.
Non-Final Office Action on U.S. Appl. No. 17/947,444 dated Sep. 23, 2024.
Non-Final Office Action on U.S. Appl. No. 18/408,368 dated Sep. 12, 2024.
Notice of Allowance on U.S. Appl. No. 17/976,107 dated Sep. 3, 2024.
Non-Final Office Action on U.S. Appl. No. 18/398,538 dated Oct. 7, 2024.

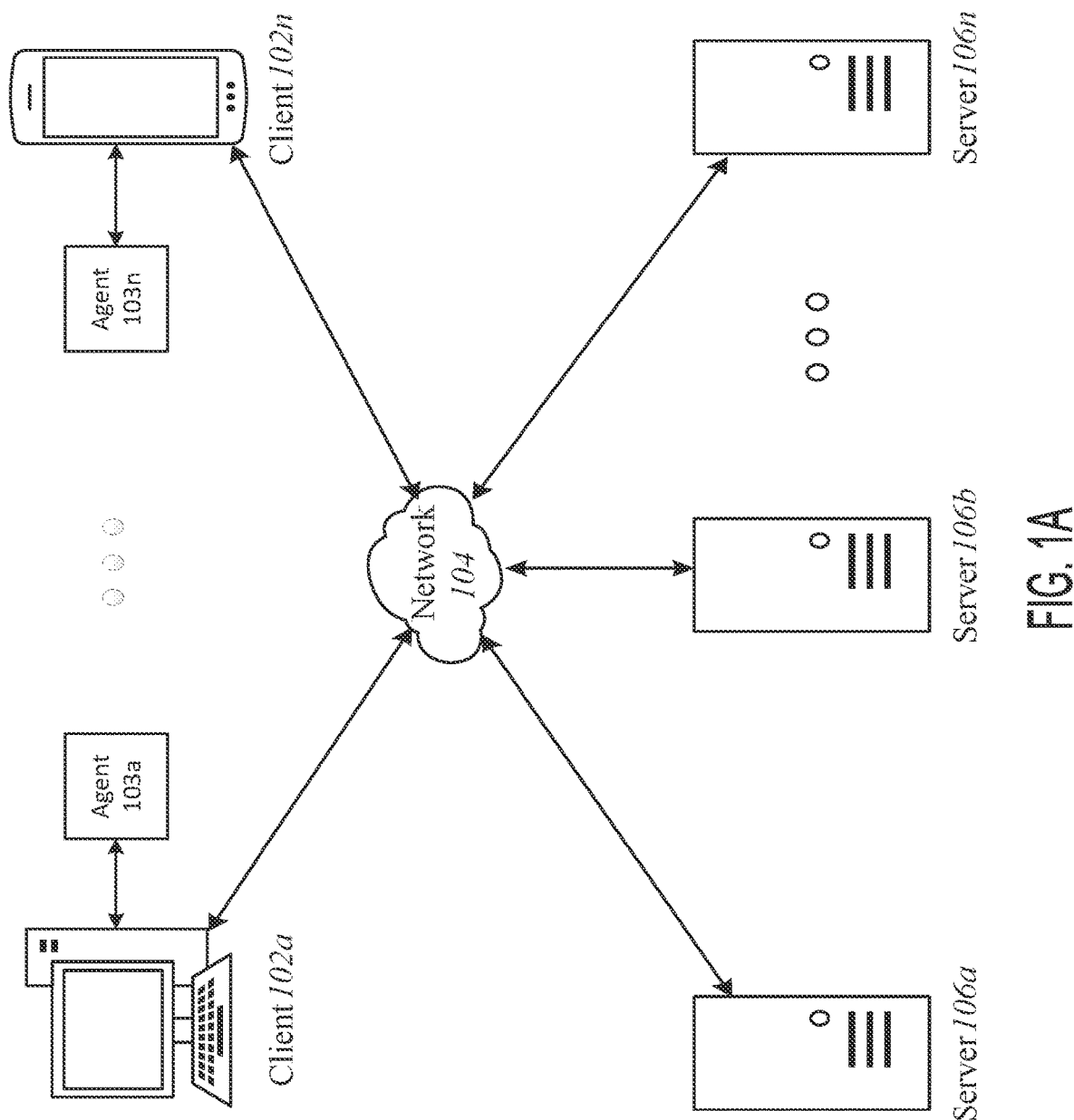

SYSTEMS AND METHODS FOR GENERATING NOTIFICATION INTERFACES SYNCHRONIZED WITH BROADCAST EVENTS AND LOCAL INTERACTIONS

CROSS-REFERENCE TO RELATED APPLICATIONS

The present application is a continuation of and claims priority to U.S. patent application Ser. No. 17/943,930, filed Sep. 13, 2022, and titled "SYSTEMS AND METHODS FOR GENERATING NOTIFICATION INTERFACES SYNCHRONIZED WITH BROADCAST EVENTS AND LOCAL INTERACTIONS," which is a continuation of and claims priority to U.S. patent application Ser. No. 17/516,200, filed Nov. 1, 2021, and titled "SYSTEMS AND METHODS FOR GENERATING NOTIFICATION INTERFACES SYNCHRONIZED WITH BROADCAST EVENTS AND LOCAL INTERACTIONS," which claims the benefit of and priority to U.S. Provisional Patent Application No. 63/273,580, filed Oct. 29, 2021, and titled "SYSTEMS AND METHODS FOR IMPROVED MANAGEMENT OF PROCESSING BROADCAST DATA," the contents of all of which are incorporated herein by reference in their entirety for all purposes.

BACKGROUND

Broadcast devices, such as cable boxes or set-top boxes, are used to display broadcast content received from a broadcast source. Due to the one-to-many nature of broadcast content, it is challenging to monitor and display information relating to a specific broadcast device with broadcast content.

SUMMARY

It is therefore advantageous for a system to provide techniques to identify characteristics of a broadcast receiver device, and to display notifications, alerts, or user interfaces in connection with broadcast content Conventional broadcast systems are incapable of providing customized or broadcast receiver device-specific information to broadcast receiver devices displaying content broadcasts, due to the one-to-many configuration of traditional broadcast systems. The systems and methods described herein overcome these limitations by generating instructions for either a broadcast provider system, which is in communication with many broadcast receiver devices, or by communicating directly with broadcast receiver devices to display notifications or user interfaces in connection with live content. The systems and methods described herein provide a significant technical improvement over traditional broadcast content systems, because the techniques described herein allow for both identifying content broadcasts being displayed at particular broadcast receiver devices, and generating display instructions to display information with those content broadcasts without interrupting or detracting from the quality of the content broadcast.

At least one aspect of the present disclosure relates to a method for generating notification interfaces synchronized with broadcast events and local interactions. The method can be performed, for example, by one or more processors coupled to memory. The method can include receiving a plurality of interactions corresponding to a conditional event opportunity of a live event from a respective plurality of client devices. The method can include identifying a broadcast receiver device that is presenting a broadcast of the live event. The method can include generating instructions for a broadcast receiver device that causes an application executing on the broadcast receiver device to display one or more content items corresponding to the conditional event opportunity. The method can include transmitting the instructions to the broadcast receiver device to cause the application to display the one or more content items with the broadcast of the live event.

In some implementations, identifying the broadcast receiver device can include determining a first physical location of the broadcast receiver device. In some implementations, the method can include identifying, based on a plurality of user profiles, a respective plurality of client devices that are located within a predetermined distance of the first physical location. In some implementations, the method can include identifying the subset of the plurality of client devices are each associated with a respective interaction of the plurality of interactions. In some implementations, the instructions can be generated such that the one or more content items include an actionable object that, when actuated, causes the application to display an interface corresponding to the conditional event opportunity.

In some implementations, the method can include selecting the one or more content items based on attributes of a plurality of user profiles that correspond to the respective plurality of client devices. In some implementations, selecting the one or more content items can further include determining a similarity score between the attributes of the plurality of user profiles and content attributes of the one or more content items. In some implementations, identifying the broadcast receiver device can further include transmitting, to a broadcast provider system in communication with a plurality of broadcast receiver devices, a request for one or more identifiers of broadcast receiver devices presenting the broadcast of the live event. In some implementations, identifying the broadcast receiver device can further include receiving, responsive to the request, an identifier of the broadcast receiver device that is presenting a broadcast of the live event.

In some implementations, the method can include further including identifying a subset of the plurality of interactions that are received from a respective plurality of client devices that are located within a predetermined distance of the broadcast receiver device. In some implementations, generating the instructions to display the one or more content items corresponding to the conditional event opportunity can be further based on the subset of the plurality of interactions. In some implementations, generating the instructions can further include determining that the broadcast receiver device does not satisfy a notification restriction condition.

Another aspect of the present disclosure relates to a system configured for generating notification interfaces synchronized with broadcast events and local interactions. The system can include one or more hardware processors configured by machine-readable instructions. The system can receive a plurality of interactions corresponding to a conditional event opportunity of a live event from a respective plurality of client devices. The system can identify a broadcast receiver device that is presenting a broadcast of the live event. The system can generate instructions for a broadcast receiver device that causes an application executing on the broadcast receiver device to display one or more content items corresponding to the conditional event opportunity. The system can transmit the instructions to the broadcast receiver device to cause the application to display the one or more content items with the broadcast of the live event.

In some implementations, identifying the broadcast receiver device can include determining a first physical location of the broadcast receiver device. In some implementations, the system can identify, based on a plurality of user profiles, a respective plurality of client devices that are located within a predetermined distance of the first physical location. In some implementations, the system can identify a subset of the plurality of client devices that correspond a respective interaction of the plurality of interactions.

In some implementations, the instructions can be generated such that the one or more content items include an actionable object that, when actuated, causes the application to display an interface corresponding to the conditional event opportunity. In some implementations, the system can select the one or more content items based on attributes of a plurality of user profiles that correspond to the respective plurality of client devices.

In some implementations, selecting the one or more content items can further include determining a similarity score between the attributes of the plurality of user profiles and content attributes of the one or more content items. In some implementations, identifying the broadcast receiver device can further include transmitting, to a broadcast provider system in communication with a plurality of broadcast receiver devices, a request for one or more identifiers of broadcast receiver devices presenting the broadcast of the live event. In some implementations, identifying the broadcast receiver device can further include receiving, responsive to the request, an identifier of the broadcast receiver device that is presenting a broadcast of the live event.

In some implementations, the system can identify a subset of the plurality of interactions that are received from a respective plurality of client devices that are located within a predetermined distance of the broadcast receiver device. In some implementations, generating the instructions to display the one or more content items corresponding to the conditional event opportunity can be further based on the subset of the plurality of interactions. In some implementations, generating the instructions can further include determining that the broadcast receiver device does not satisfy a notification restriction condition.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

DETAILED DESCRIPTION

Figure 1B:
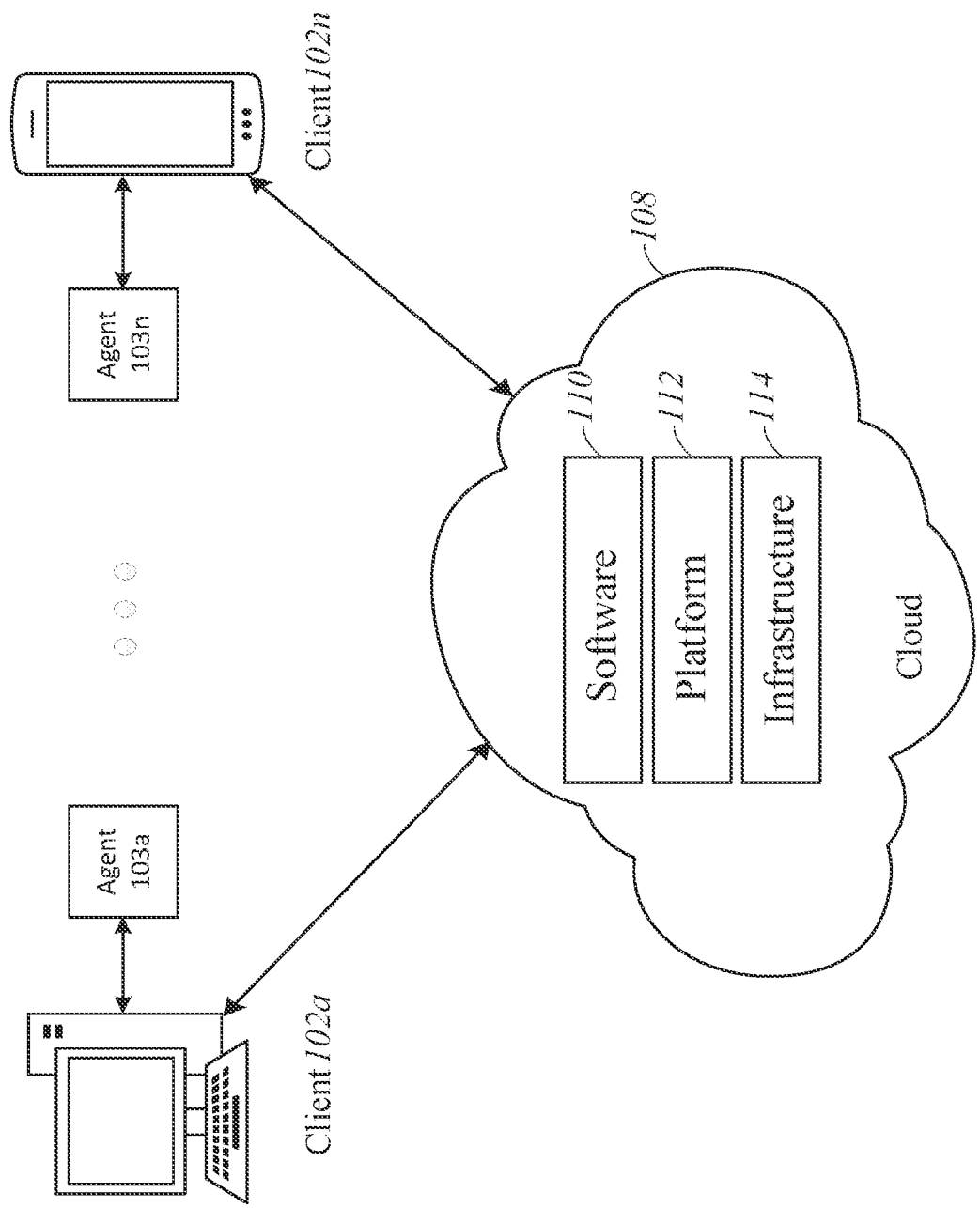
FIG. 1B is a block diagram depicting a cloud computing environment comprising a client device in communication with cloud service providers.

Below are detailed descriptions of various concepts related to, and implementations of, techniques, approaches, methods, apparatuses, and systems for generating notification interfaces based on interactions with broadcast events. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for generating notification interfaces synchronized with broadcast events and local interactions.

A. Computing and Network Environment

Prior to discussing specific implementations of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include Bluetooth, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., Windows NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the Hyper-V hypervisors provided by Microsoft; or others. Hosted hypervisors may run within an operating system on a second software level. Examples of hosted hypervisors may include VMware Workstation and VirtualBox.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back-end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, or web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
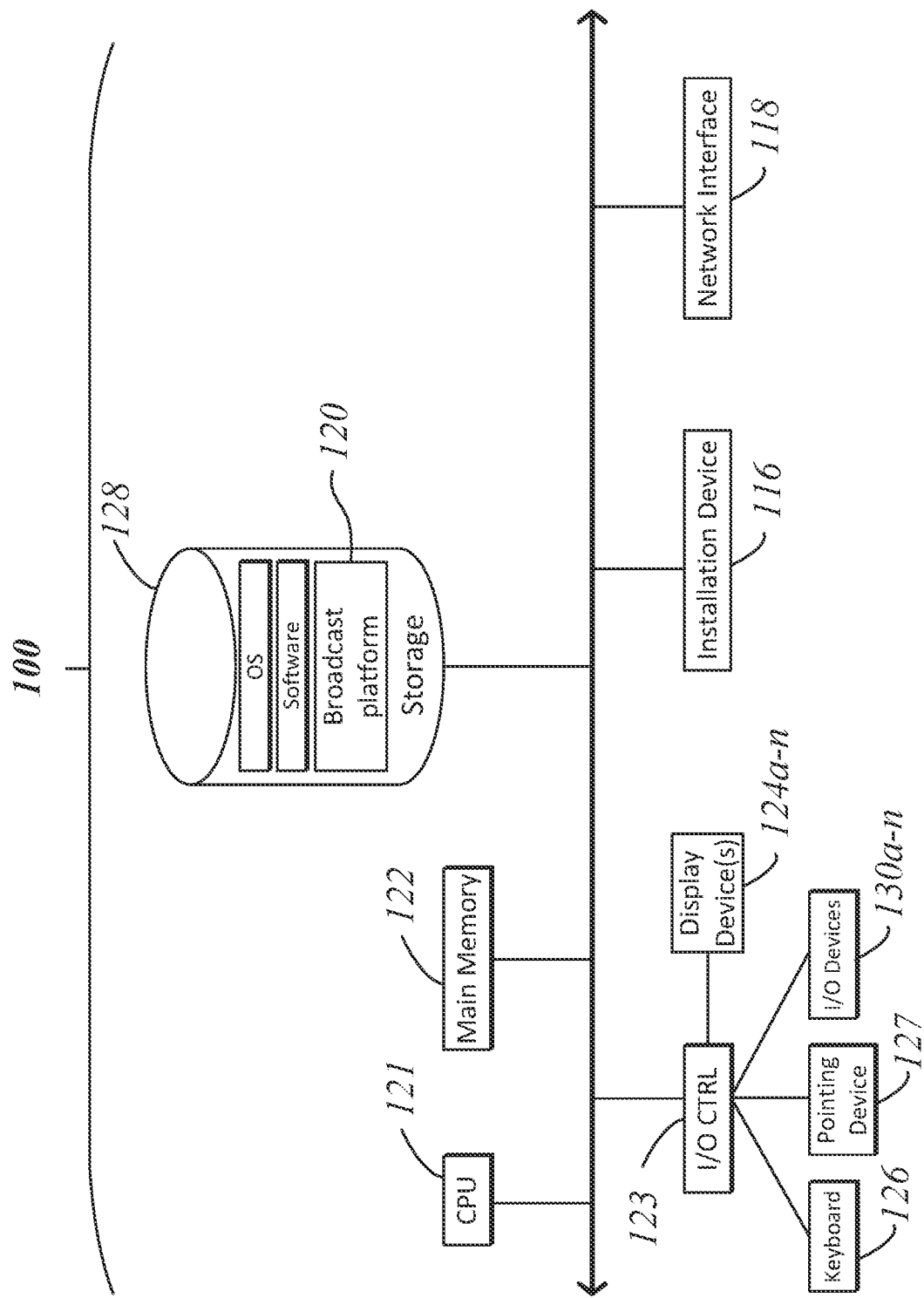
FIGS. 1C and 1D are block diagrams depicting embodiments of computing devices useful in connection with the methods and systems described herein.
Figure 1D:
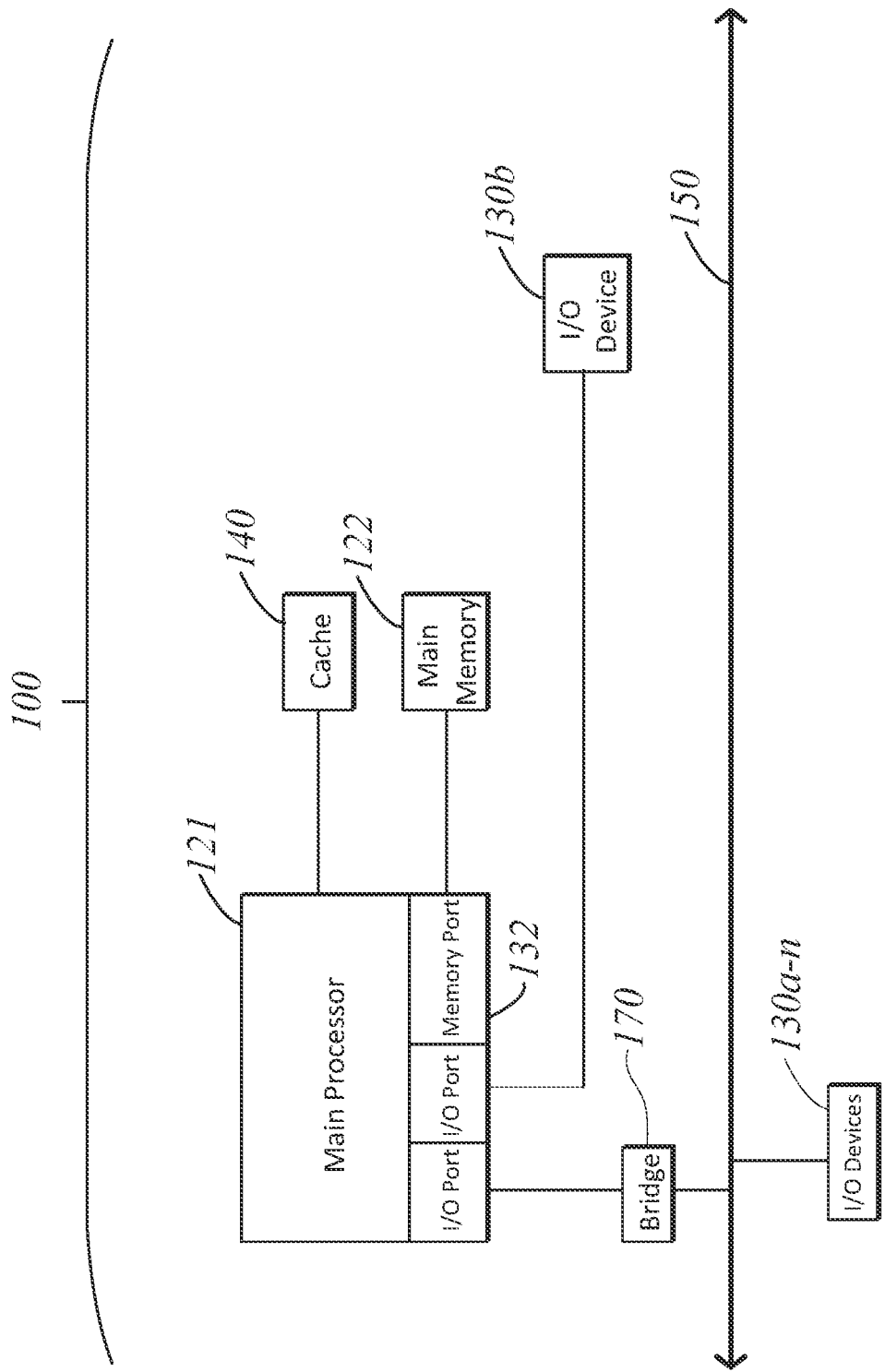

The client 102 and server 106 may be deployed as and/or executed on any type and form of computing device, e.g. a computer, network device, or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g. a mouse. The storage device 128 may include, without limitation, an operating system, software, and broadcast platform 120, which can implement any of the features of the event processing system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction-level parallelism, thread-level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch-sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable, or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the broadcast platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase, and/or download an application via the application distribution platform.

Furthermore, the computing device 100 may include a network interface 118 to interface to the network 104 through a variety of connections including, but not limited to, standard telephone lines, LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution or Ubuntu, distributed by Canonical Ltd. of London, United Kingdom; or Unix or other Unix-like derivative operating systems; and Android, designed by Google of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone, or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, or an XBOX ONE S device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the client device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the client devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Generating Notification Interfaces Synchronized with Broadcast Events and Local Interactions Conventionally, broadcast receiver systems or devices, such as cable boxes, set top boxes, and satellite receiver boxes, operate using fixed hardware and software that does not enable third-party communications with external sources. For example, although cable boxes may communicate with broadcast provider systems, such as cable providers or other broadcast providers, such receiver boxes are generally unable to display additional content or monitor the broadcast content displayed by broadcast provider systems. Further, even if such broadcast receiver devices include applications that can communicate with third-party servers, these devices do not include the capabilities to display content or application information at the same time (e.g., in a seamless manner) as broadcast content provided by broadcast systems. The systems and methods of this technical solution these and other issues by extending the functionality of applications and environments on broadcast receiver devices, to provide applications that display additional content, which may include notifications, alerts, or other interactive interfaces, with broadcast content. To do so, a server or other external computing device can generate display instructions for applications executing on such broadcast receiver devices to display additional user interfaces with broadcast content, and transmit those instructions via a computer network or via a proprietary broadcast network maintained by a broadcast provider. In doing so, the additional content, which may include interactive user interfaces, can be displayed such that it that seamlessly integrates the application interfaces with broadcast content provided by a broadcast provider system.

The systems and methods described herein overcome the limitations of conventional broadcast systems, which are unable to present additional content items or event-related information with broadcast content, by generating instructions for broadcast receiver devices to display additional interactive content with content broadcasts. The systems and methods described herein can generate instructions for either a broadcast provider system, which may be in communication with many broadcast receiver devices, or by communicating directly with broadcast receiver devices to display notifications or user interfaces in connection with live content. The systems and methods described herein provide a significant technical improvement over traditional broadcast content systems, because the techniques described herein allow for both identifying content broadcasts being displayed at particular broadcast receiver devices, and generating display instructions to display information with those content broadcasts without interrupting or detracting from the quality of the content broadcast.

The systems and methods described herein provide techniques for displaying wagers or notifications from multiple players that may be viewing a content broadcast presented by a broadcast receiver device, such as a cable box, a set top box, or other types of broadcast receivers. A system can receive messages related to a live event from client devices via a network, and subsequently identify a broadcast receiver device that is presenting that live event (e.g., where the broadcast receiver device may be associated with the client devices, etc.). The system can generate instructions for the broadcast receiver device to display content items, which may be interactive content items or content items that include information provided in the messages, with a broadcast of the live event. The content items can be displayed, for example, by an application executing at the broadcast receiver device that receives and interprets the instructions to display, for example, real-time wagers that are placed in connection with a broadcast of a live event. These and other improvements are detailed herein below.

As described herein, the term "broadcast event" can refer to any event that is broadcasted via a broadcast provider system (e.g., DIRECT TV, XFINITY, etc.). These broadcast events can be either live, pre-recorded, and/or re-runs. For example, broadcast events can include sport games, poker matches, Olympic games, live reality shows, and live game shows, among any other type of event that may be broadcast live. While the systems and methods disclosed herein generally refer to sporting events or sports games, these are merely examples of the present techniques, and should not be considered limiting.

In addition, the term "broadcast" need not necessarily be limited to content provided via proprietary television networks (e.g., cable, fiber-optic, satellite, etc.). Indeed, the term "broadcast," as used herein, may be used to describe both television content and live-streaming content provided via computer networks from one or more servers. Such live streams may be provided to various client devices or broadcast receiver devices via one or more computer networks. The live streams may depict live events such as sport games, poker matches, Olympic Games, live reality shows, and live game shows, among other live events.

Figure 2:
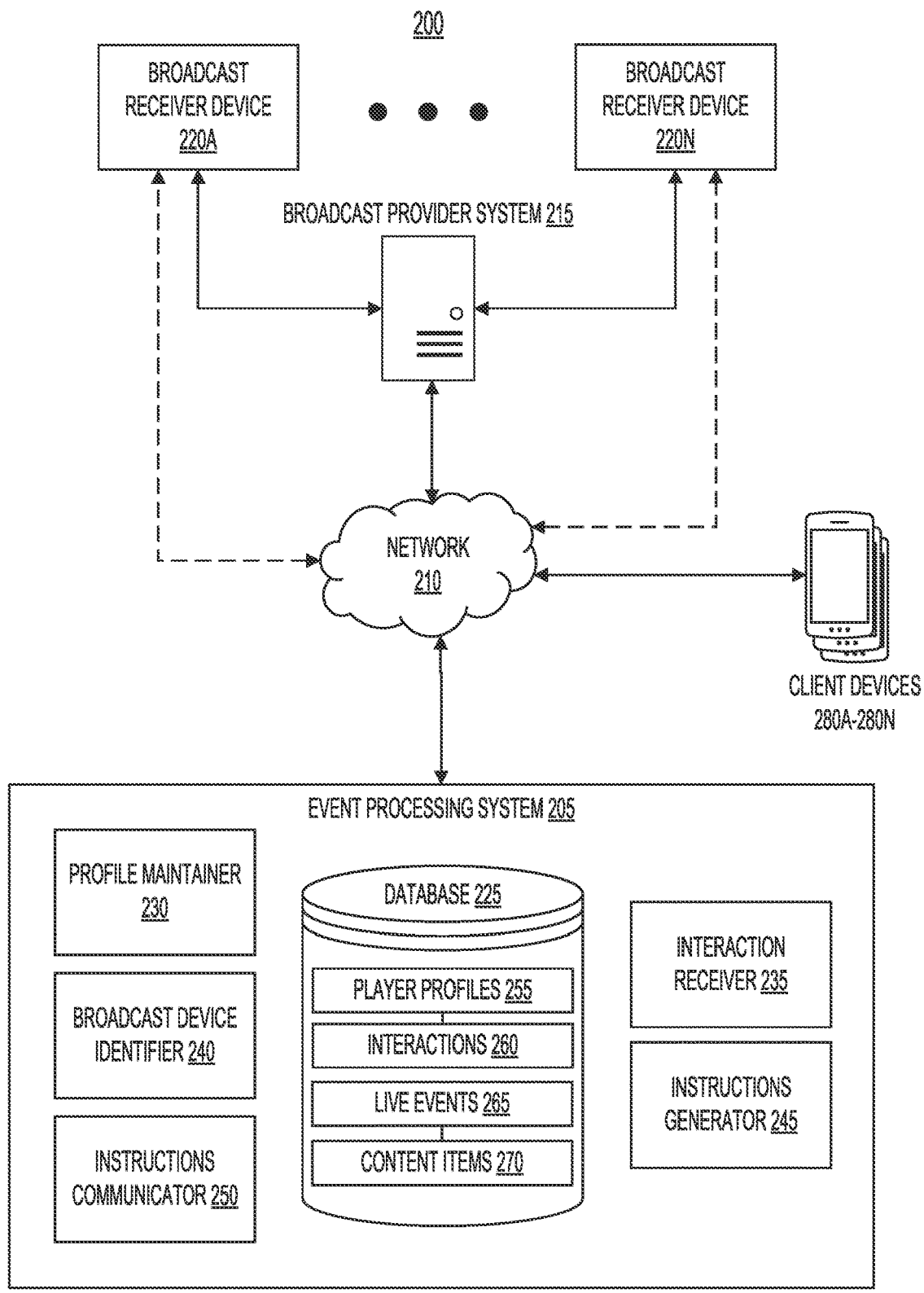
FIG. 2 is a block diagram of an example system for generating notification interfaces synchronized with broadcast events and local interactions, in accordance with one or more implementations.

Referring now to FIG. 2, illustrated is a block diagram of an example system 200 generating notification interfaces based on interactions with broadcast events, in accordance with one or more implementations. The system 200 can include at least one event processing system 205, at least one network 210, at least one broadcast provider system 215, one or more broadcast receiver devices 220A-220N (sometimes generally referred to as "broadcast receiver device(s) 220" or "receiver device(s) 220"), and one or more client devices 280A-280N (sometimes generally referred to as "client device(s) 280"). The event processing system 205 can include at least one profile maintainer 230, at least one interaction receiver 235, at least one broadcast device identifier 240, at least one instructions generator 245, and at least one instructions communicator 250, and at least one database 225. The database 225 can include one or more player profiles 255, data structures corresponding to interactions 260 (sometimes generally referred to herein as the "interactions(s)260"), data structures corresponding to live events 265 (sometimes generally referred to herein as the "live event(s) 265"), and one or more content item(s) 270. In some implementations, the database 225 can be external to the event processing system 205, for example, as a part of a cloud computing system or an external computing device in communication with the devices (e.g., the event processing system 205, the broadcast provider system 215, the broadcast receiver devices 220, etc.) of the system 200 via the network 210 or via another type of communication network (e.g., a cable network, a fiber network, or another type of broadcast network, etc.).

Each of the components (e.g., the event processing system 205, the network 210, the broadcast provider systems 215, the broadcast receiver devices 220, the client devices 280, the profile maintainer 230, the interaction receiver 235, the broadcast device identifier 240, the instructions generator 245, and the instructions communicator 250, the database 225, etc.) of the system 200 can be implemented using the hardware components or a combination of software with the hardware components of a computing system, such as the computing system 100 detailed herein in conjunction with FIGS. 1A-1D, or any other computing system described herein. Each of the components of the event processing system 205 can perform the functionalities detailed herein.

The event processing system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The event processing system 205 can include one or more computing devices or servers that can perform various functions as described herein. The event processing system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, and combinations thereof. The event processing system 205 of the system 200 can communicate via the network 210, for instance with the broadcast provider system 215 or the client devices 280. The network 210 may be any form of computer network that can relay information between the event processing system 205, the broadcast provider systems 215, the client devices 280, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections.

Any or all of the computing devices described herein (e.g., the event processing system 205, the broadcast provider systems 215, the computer system 100, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the event processing system 205, the broadcast provider system 215, the client devices 280, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B. In some implementations, the broadcast receiver devices 220 may communicate via the network with the event processing system 205. However, in some implementations, the broadcast receiver devices 220 may communicate with the event processing system 205 only via the broadcast provider system 215, as described herein.

The broadcast provider system 215 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast provider system 215 can include one or more computing devices or servers that can perform various functions as described herein. The broadcast provider system 215 can include any or all of the components and perform any or all of the functions of the computer system 100 described herein in conjunction with FIGS. 1A-1D. The broadcast provider system 215 can include similar features and functionality of the client devices 102 or the servers 106 described herein above in conjunction with FIGS. 1A-1D.

The broadcast provider system 215 can be implemented using hardware or a combination of software and hardware. In some implementations, the broadcast provider system 215 can be configured to provide cable services. The cable services can be provided via a cable distribution network or over network 215. A cable distribution network can connect the distribution source (e.g., broadcast provider system 215) to the equipment of a player (e.g., broadcast receiver 220). In some implementations, the connection can be a hardwired cable network utilizing coaxial, twisted-pair, and fiber-optic, among others. In various implementations, the connection can be a wireless network utilizing a mobile network (e.g., 4G, 5G, 6G), and satellites, among others.

Additionally, in some implementations, the broadcast provider system 215 can include an input device that couples and communicates with the various computing devices described herein. For example, the broadcast provider system 215 may be configured to relay data received from the broadcast receiver devices 220, or other client computing devices, to the event processing system 205. In another example, the broadcast provider system 215 may receive instructions from the event processing system 205 and subsequently communicate with each broadcast receiver device 220 that is identified in the instructions. The instructions can be, for example, display instructions that cause content (e.g., the content items described in greater detail herein below) to be displayed in connection with broadcast content provided by the broadcast provider system 215.

Figure 3A:
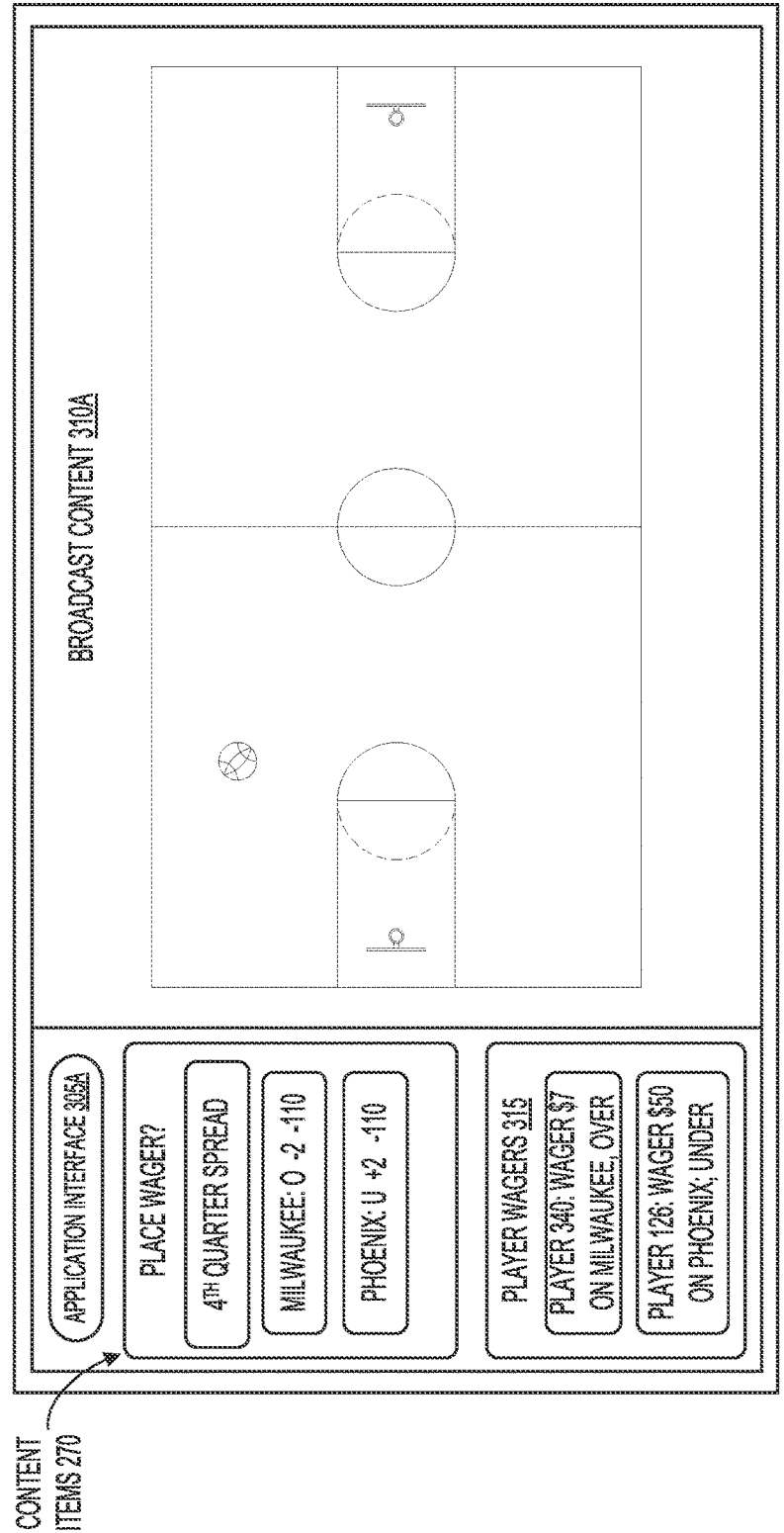
FIGS. 3A, 3B, and 3C illustrate example interfaces for displaying notifications, alerts, or other information in conjunction with content broadcasts, in accordance with one or more implementations.
Figure 3B:
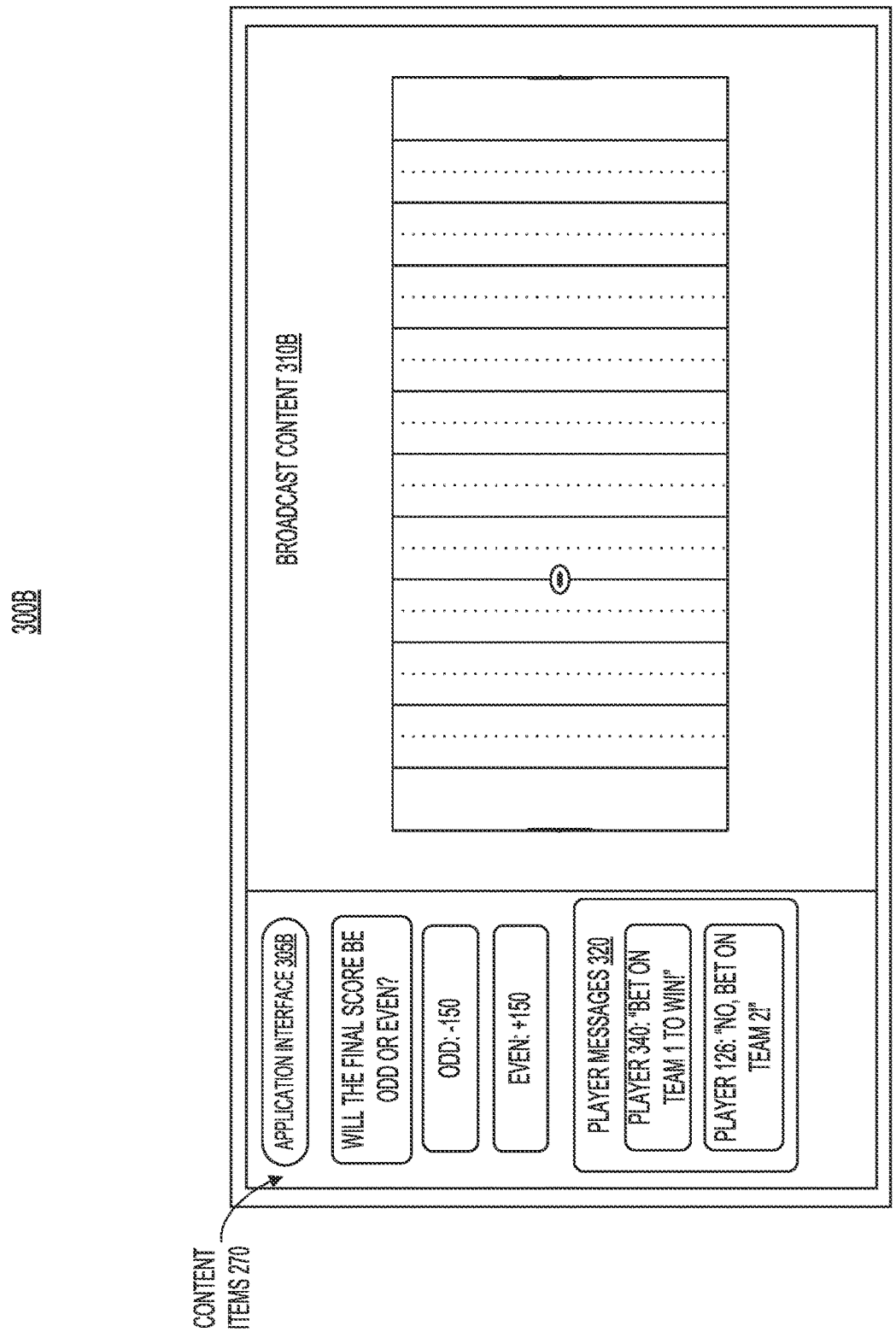
Figure 3C:
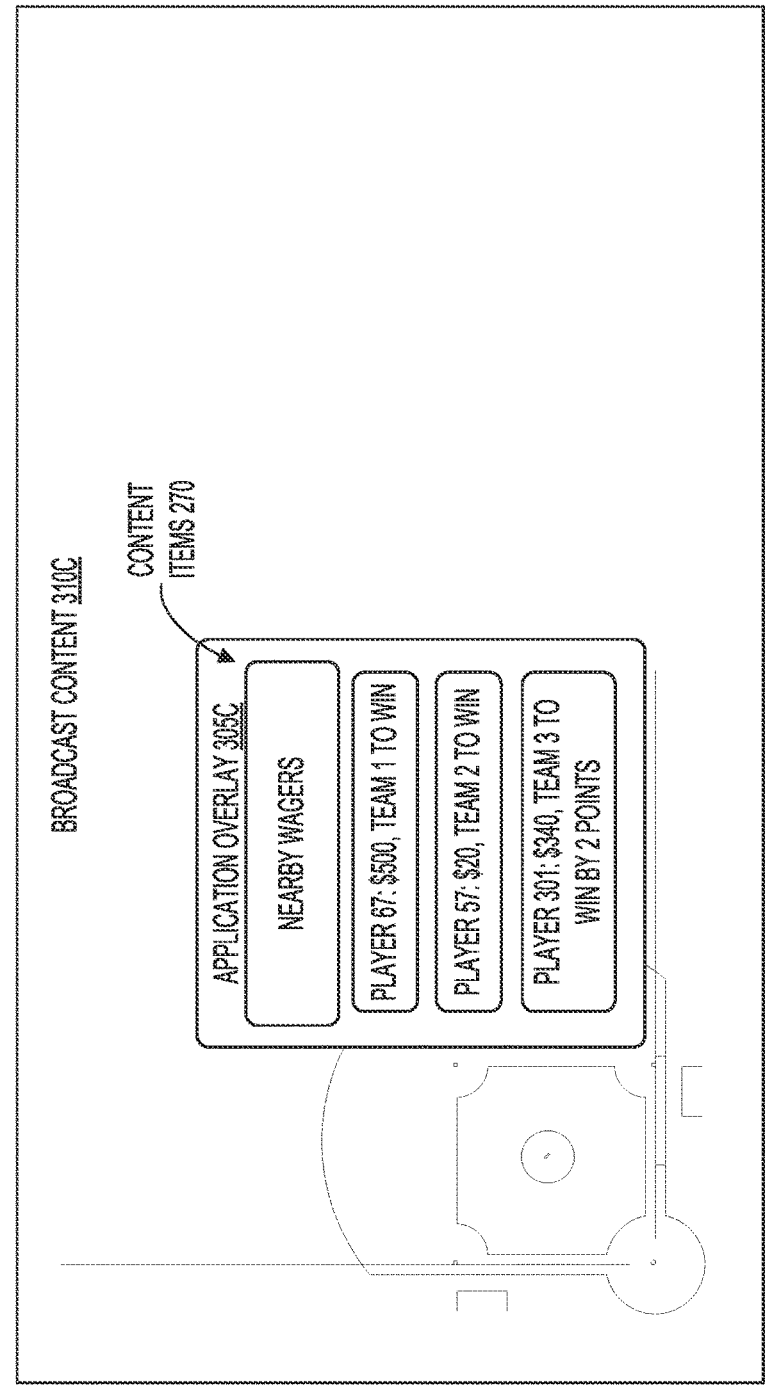

Some example interfaces of live broadcast content being displayed in connection with updated notifications, alerts, or other content based on live content is shown in FIGS. 3A, 3B, and 3C. The notifications, alerts, and other content displayed with live broadcast content can be selected or generated by the event processing system 205 based on, for example, a player profile (e.g., the player profiles 255 described herein below, etc.) used to access one or more features of an application executing on the broadcast receiver device 220. In some implementations, the broadcast receiver device 215 can access third-party information, such as information related to live sporting events or other live events, to provide up-to-date content to the broadcast receiver devices 220 according to the display instructions. For example, in some implementations, display instructions received from the event processing system 205 can indicate that one or more portions of content should include up-to-date or near real-time information, which can change based on real-time conditions of a live event. In such implementations, the broadcast provider device 215 can access one or more third-party information sources, which may include the event processing system 205, to provide up-to-date information to the broadcast receiver devices 220, in addition to the display instructions received from the event processing system 205.

In some implementations, the broadcast provider system 215 can provide broadcast content via digital or analog television signals, or otherwise encoded signals via a proprietary network, to the broadcast receiver devices 220. The broadcast provider system 215 may communicate with broadcast receiver devices 220, such as more cable boxes, set top boxes, or other types of devices that can receive broadcast content. The broadcast provider system 215 may communicate with the broadcast receiver devices 220 via a cable network (e.g., via one or more cable modem termination systems, etc.). In some implementations, the broadcast provider system 215 can communicate with the broadcast receiver devices 220 via a hybrid fiber-coaxial infrastructure that delivers broadcast content or broadband services. In some implementations, the broadcast provider system 215 may communicate with the broadcast receiver devices 220 via a fiber-optic network infrastructure that can deliver broadcast content or broadband services. In such implementations, the broadcast receiver devices 220 can be, or may include, optical network termination units or gateways. In some implementations, the broadcast provider system 215 may transmit broadcast content data (and in some implementations, instructions received from the event processing system 205) via one or more satellites. In such implementations, the broadcast receiver devices 220 may be communicatively coupled to one or more satellite receiver dishes, and can receive the information transmitted by the broadcast provider system 215 via transmissions from the satellites. The broadcast provider system 215 may communicate via one or more communication interfaces with any such proprietary broadcast network or broadband service network to provide broadcast content or display instructions received from the event processing system 205 as described herein.

Each of the broadcast receiver devices 220 can include at least one processor and a memory, e.g., a processing circuit.

The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The broadcast receiver devices 220 can include one or more computing devices or servers that can perform various functions as described herein. The one or more broadcast receiver devices 220 can include any or all of the components and perform any or all of the functions of the computer system 100 described herein in conjunction with FIGS. 1A-1D. The broadcast receiver devices 220 can include similar features and functionality of client devices 102 described herein above in conjunction with FIGS. 1A-1D.

Each broadcast receiver device 220 can include, but is not limited to, a cable box (cable converter box, or television converter box), a set-top box, a satellite receiver, a special-use PC Card device (e.g., CableCard, AllVid), a television device, a mobile device, or another type of computing device. Cable boxes can convert digital television signals to analog or digital signals that can be decoded and displayed by a television, or unscramble a television signal provided by the broadcast provider system 215 or the event processing system 205. Set-top boxes can enable a television, or another type of display device to receive and device digital television (DTV) broadcasts. A satellite receiver can be a computing device that can be configured to receive and decode radio signals from one or more satellites, which can then be converted into a format that is useable for a television display. Generally, the cable boxes, set-top boxes, and satellite receivers can be tuning devices that can transpose or convert channels from a cable television service (e.g., provided by broadcast provider system 215 or event processing system 205) to an analog or digital radio frequency (RF) signal. In some implementations, each broadcast receiver device 220 can be a television or another type of computing device with a converter integrated within the broadcast receiver device 220 (e.g., within a same enclosure). In some implementations, the broadcast receiver devices 220 may be computing devices that receive broadcast content in the form of a live-stream video, for example, via the internet. Live stream videos of live events may be provided via web-based or native application interfaces, and may be received by the broadcast receiver devices 220 via one or more suitable computer networks (e.g., the network 210). In such implementations, the broadcast provider system 215 may be a provider of live stream broadcast content, and can provide the live stream broadcast content via the network 210. Similarly, the broadcast receiver devices 220 may be any type of computing device capable of receiving live stream content via a computer network.

Each broadcast receiver device 220 can be implemented using hardware or a combination of software and hardware. In some implementations, each broadcast receiver device 220 can be configured to receive cable services from the broadcast provider system 220. In various implementations, a broadcast receiver device 220 can include a display or display portion. Alternatively, the broadcast receiver device 220 can be configured to provide a converted signal for display on a display device such as a television or a monitor. The display can include a display portion of a television, a display portion of a computing device, a graphical user interface (GUI), or another type of interactive display (e.g., a touch-screen, a display, etc.) and one or more input/output (I/O) devices (e.g., a remote, a mouse, a keyboard, a digital keypad, a gamepad, etc.).

The display can include one or more portions, for example, to display broadcast content and at least one application displayed in addition to the broadcast content. The display can include a touch screen displaying an application, such as live event windows and/or notification windows described herein. The display can include a border region (e.g., side border, top border, bottom border). In some implementations, the display can include a touch screen display, which can receive interactions from a player. The interactions can result in interaction data, which can be stored and transmitted by the processing circuitry of the broadcast receiver device 220. The interaction data can include, for example, interaction coordinates, an interaction type (e.g., click, swipe, scroll, tap, etc.), and an indication of an actionable object with which the interaction occurred.

In some implementations, a player (e.g., a user of the broadcast receiver device 220) can interact with actionable objects provided in notifications, alerts, or content using a remote, a gamepad, or some other type of controller that allows selection of user interface elements presented in an application executing on the broadcast receiver device 220. Each broadcast receiver device 220 can include an input device (e.g., a remote, a gamepad, a controller, a keyboard, a mouse, a touchscreen, etc.) that couples or communicates with the display of each client device to enable a player to interact with and/or select one or more actionable objects as described herein. The display can enable interaction with one or more visual indications provided through the display of each broadcast receiver device 220, and responsive to an interaction (e.g., select, click-on, touch, hover), the broadcast receiver device 220 can generate an indication identifying a user input and/or selection of a notification, alert, or an actionable object (e.g., button, selectable content, hyperlink, a user interface element, etc.), among others.

In some implementations, each broadcast receiver device 220 can convert digital television signals to analog signals and/or unscramble a television signal. Upon converting and/or unscrambling the digital television signal, the broadcast receiver device 220 can provide an output to the broadcast receiver device 220 display and/or client device 280. For example, the broadcast receiver device 220 may be an all-in-one computing device configured to receive and configure signals (e.g., from the event processing system 205) and can be configured to display (or stream) content of the television signals on an integrated display of the broadcast receiver device 220. For example, the broadcast receiver device 220 may be a television, a smart television, and/or an internet enabled device with a display, among others. In another example, the broadcast receiver device 220 may be a cable box (or set-top box) configured to receive and configure signals (e.g., from the broadcast provider system 210) and can display (or stream) content of the television signals on an integrated display of the broadcast receiver device and/or a client device.

In some implementations, the broadcast receiver device 220 may be a computer-enabled television (referred to herein as a "smart television") that receives decoded broadcast content via a set top box, cable box, or a computing device that receives broadcast satellite signals (a "satellite box"). In such implementations, the broadcast receiver device 220 can receive and display broadcast content provided by the broadcast provider system 215 via the cable box, set top, or satellite box. The broadcast receiver device 220 can execute one or more applications, which may be associated with as the event processing system 205 described in greater detail herein below. The application executing on the broadcast receiver device 220 can establish one or more communication sessions with the event processing system 205 via the network 210. The application(s) can receive instructions to display notifications as described herein from the event processing system 205, which may be presented on one or more user interfaces with the broadcast content received via the cable box, set top box, or satellite box. In such implementations, the broadcast receiver device 220 can communicate with the cable box, set top box, or satellite box to perform one or more actions, such as schedule or modify a recording, or to change to a different broadcast channel.

For example, in some implementations, the instructions provided by the event processing system 205 can include instructions to present actionable objects which, when actuated, cause the broadcast receiver device 220 to navigate to and display broadcast content different from broadcast content currently being displayed. To do so, the smart television (e.g., the broadcast receiver device 220), upon detecting the actuation, may communicate a request to the cable box, set top box, or satellite box to navigate to broadcast content identified in the instructions. For example, the instructions may identify a particular channel or channel(s) on which the broadcast content is being displayed. The broadcast receiver device 220 (or the application executing thereon) can send a request to the cable box, set top box, or satellite box to navigate to the identified channel. In some implementations, the application executing on the smart television (e.g., the broadcast receiver device 220) can communicate with the broadcast provider system 215 to request a channel guide or schedule corresponding to the player associated with the cable box, set top box, or satellite box. Using the channel guide, the application executing on the broadcast receiver device 220 can identify the specific channel on which the broadcast content identified in the instructions is being provided. Once the channel is identified, the broadcast receiver device 220 can transmit a request to the cable box, set top box, or satellite box to navigate to and display the channel. The broadcast receiver device 220 can communicate with the cable box, set top box, or satellite box via any number of communication protocols, such as a Bluetooth protocol, a WiFi protocol (e.g., web-sockets), or any other type of communication protocol.

In some implementations, the instructions provided by the event processing system 205 can include instructions to present actionable objects which, when actuated, cause the broadcast receiver device 220 to schedule a recording for a broadcast of a live event (or a portion of the broadcast). In some implementations, the instructions may include instructions that cause the broadcast receiver device 220 to schedule a recording for a broadcast of a live event (or a portion of the broadcast), rather than display a corresponding notification. To do so, the smart television (e.g., the broadcast receiver device 220), may communicate a request to the cable box, set top box, or satellite box to record broadcast content (or a portion of the broadcast content) identified in the instructions. For example, the instructions may identify a particular channel or channel(s) on which the broadcast content is being displayed, a start time for the recording, an end time for the recording, or a duration of the recording. The broadcast receiver device 220 (or the application executing thereon) can send a request to the DVR, the cable box, set top box, or satellite box to navigate to schedule a recording at the identified channel for at the start time for the live event (or the portion thereof).

In some implementations, the application executing on the smart television (e.g., the broadcast receiver device 220) can communicate with the broadcast provider system 215 to request a channel guide or schedule corresponding to the player associated with the cable box, set top box, or satellite box. Using the channel guide, the application executing on the broadcast receiver device 220 can identify the specific channel on which the broadcast content identified in the instructions is being provided, as well as the duration of the broadcast (or an identified portion of the broadcast). Once the channel, start time, and end time are identified, the broadcast receiver device 220 can transmit a request to the DVR, cable box, set top box, or satellite box to schedule a recording for the identified broadcast content on the identified channel at the identified start time (until the identified end time, e.g., based on the duration of the recording). The broadcast receiver device 220 can communicate with the DVR, cable box, set top box, or satellite box via any number of communication protocols, such as a Bluetooth protocol, a WiFi protocol (e.g., web-sockets), or any other type of communication protocol. The broadcast receiver device 220 can utilize one or more APIs corresponding to the DVR, cable box, set top box, or satellite box, which can provide functions to schedule or modify recordings according to requests.

Each broadcast receiver device 220 can be associated with a device identifier, which can be specific to each respective broadcast receiver device 220. The device identifier can include a script, code, label, or marker that identifies a particular broadcast receiver device 220. In some implementations, the device identifier can include a string or plurality of numbers, letters, characters or any combination numbers, letters, and characters. In some embodiments, each broadcast receiver device 220 can have a unique device identifier. Each broadcast receiver device 220 can execute a client application, which can be a live event application that communicates with the event processing system 205 to view notifications, alerts, or additional content, with broadcast content displayed by the broadcast receiver device 220. The client application can include a user application executing on each broadcast receiver device 220 or provided to the broadcast receiver device 220 by a server (e.g., the event processing system 205, one or more servers 106, etc.).

The application can include a web application, a server application, a resource, or a file. In some implementations, the application can include a local application (e.g., local to a broadcast receiver device 220), hosted application, Software as a Service (SaaS) application, virtual application, mobile application, and other forms of content. In some implementations, the application can include or correspond to applications provided by remote servers or third-party servers. In some implementations, the application can access or identify the player profiles 255, the interactions 260, the live events 265, or the content items 270, stored and maintained at the database 225. The application can present one or more notifications, alerts, or other types of content, which can include up-to-date content that is updated in real-time or near real-time based on conditions detected in live events. In some implementations, the application can transmit a request to create a viewing session, as described herein. The request can include, for example, one or more identifiers of player profiles 255 that are invited to participate in the viewing session. The content items, as described herein, can include one or more actionable objects, such as the actionable objects described herein below in conjunction with FIGS. 3A-3C, and can be presented to a player through a broadcast receiver device 220. Such actionable objects can include user-selectable hyperlinks, buttons, graphics, videos, images, user interface elements, or other application features that generate a signal that is processed by the application executing on the respective broadcast receiver device 220.

In some implementations, the broadcast receiver devices 220 can establish one or more communication sessions with the event processing system 205 or the broadcast provider system 215. In implementations where the broadcast receiver devices 220 communicate with the event processing system 205 via the broadcast provider system 215, the broadcast receiver devices 220 can communicate messages to and from the event processing system 205 via the proprietary communication network of the broadcast provider system 215. The broadcast provider system 215 can then relay those messages to and from the event processing system 205 to facilitate communication (or a communication session) between the broadcast receiver devices 220 and the event processing system 205. The one or more communication sessions can each include a channel or connection between the event processing system 205 and the one or more broadcast receiver devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic. Such communication sessions can be used to request and provide up-to-date information for display with broadcast content, as described herein.

Each of the broadcast receiver devices 220 can be computing devices configured to communicate via the network 210 to access information resources, such as web pages via a web browser, or application resources via a native application executing on a broadcast receiver device 220. When accessing information resources, the broadcast receiver device 220 can execute instructions (e.g., embedded in the native applications, in the information resources, etc.) that cause the broadcast receiver devices 220 (or client devices 280) to display event interfaces with broadcast content received from the broadcast provider system 215, such as the event interfaces described herein below in conjunction with FIGS. 3A-3C. The live event application interfaces can be, for example, application interfaces that present different types live event notifications, alerts, content items, or other types of interactive content. In general, the content items can include content (e.g., images, video, animations, graphics, audio, etc.) that can be presented to a player via the input/output interfaces of a display device forming a part of or in communication with the broadcast receiver device 220 executing the application. The application executing on the broadcast receiver device 220 can receive instructions to display notifications, alerts, content items, or other information from the event processing system 205 as described herein. The application can parse the instructions and execute or otherwise carry out the operations specified in the instructions to display the notifications, alerts, content items, or other information from the event processing system 205.

In some implementations, the instructions can include an indication that portions of the displayed content are to be updated in real-time or near real-time. To make sure that the content indicated as real-time or near real-time is up-to-date, the application executing on the broadcast receiver device 220 can query (e.g., ping, transmit a request on a periodic basis, etc.) the event processing system 205 in one or more communication sessions to request up-to-date versions of the indicated content. If a content update is available, the event processing system 205 can transmit the updated content to the broadcast receiver device 220. In some implementations, the broadcast receiver device 220 can wait to receive updates to the indicated portions of content, and when the content is received, display the updated content with the broadcast content. Examples of real-time or near real-time content are shown in FIGS. 3A, 3B, and 3C.

The broadcast receiver device 220 (or an application executing on the broadcast receiver device 220) can receive instructions to display a notification, an alert, a content item, or other additional content, from the event processing system 205. In some implementations, the instructions can include data relating to broadcast content. The data relating to broadcast content can include one or more identifiers of broadcasts of live events, or one or more attributes (e.g., wager statistics, odds, potential payout amounts, current wager amounts, aggregate wager amounts on one or more events, upcoming or current critical events or moments, fantasy lineup information in a player profile 255 associated with the broadcast receiver device, event information, etc.) relating to those live events. Event information can include one or more data structures that include any information related to an event (e.g., a historic, current, or upcoming event, etc.) such as an event time, event score (e.g., in the case of sporting events, score of one or more teams or players of the event, etc.), wager information (e.g., information about wager opportunities, information about ongoing wagers), information about whether the player has indicated a desire to wager in similar scenarios (e.g., previous activity), or other event information described herein.

In some implementations, the event information can be updated in real-time on the broadcast receiver device 220 (or client devices 280) as the live event occurs (or progresses) (e.g., as the event is processed by the live event system 205 according to the content items and transmitted to the broadcast receiver devices 220, etc.). The indications of event information can include instructions that cause the broadcast receiver device 220 to display one or more notifications, alerts, or content items. This additional content can be selected by the event processing system 205 based on various attributes of a player profile 255 associated with a broadcast receiver device 220, including wager opportunities based on current in game events (e.g., elapsed time, player statistics, team statistics, game statistics, etc.) historical activity data of the player profile 255, or historical live events accessed or interacted with by the player profile 255, among others. The broadcast receiver devices 220 can receive instructions from the live event system 205 that can cause the broadcast receiver device 220 to display the notifications, alerts, or content items, which can one or more actionable objects, such as the actionable objects described herein below in conjunction with FIGS. 3A-C.

As described herein, a broadcast receiver device 220 can receive one or more interactions with actionable objects presented on the display of the client device. Interactions can be selections (e.g., made with a remote, a gamepad, a controller, or other input device, etc.) tap interactions, click interactions, or other types of indications that a player is engaged with a particular user interface element. Upon detecting an interaction with a particular user interface element, the broadcast receiver device 220 can execute instructions (e.g., processor-readable code, a script, etc.) that cause the broadcast receiver device 220 to transmit an appropriate signal to the event processing system 205 (e.g., via the broadcast provider system 215, via the network 110, etc.). A signal can include any information specified by the instructions associated with the particular actionable object with which the user interacted. The signals can include, for example, an interaction indication, which can provide any information relating to the user interface element with which the user interacted (e.g., a wager, a selection of a notification to navigate to other broadcast content, selection of a notification to record broadcast content, a request to view a live event associated with a current or potential wager, etc.).

As described herein, a broadcast receiver device 220 and the event processing system 205 can exchange messages directly (or indirectly via broadcast provider system 215) containing information that causes an interactive live event interface to be displayed on the display of the broadcast receiver device 220. By interacting with the actionable objects presented on the display of the broadcast receiver device 220, the event processing system 205 can provide instructions to display notifications, alerts, and content items to broadcast receiver device 220 that cause the broadcast receiver device 220 (or the application executing on the broadcast receiver device 220) to change the user interface to display the notifications, alerts, and content items with broadcast content such as a live event. In some implementations, the broadcast receiver devices 220 (or the application executing on the broadcast receiver devices 220) can display said notifications, alerts, and content items in accordance with a notification display policy, a notification transmission policy, a notification generation policy, or other policies that allow or restrict the display of notifications, alerts, or content items. In some implementations, the broadcast receiver device 220 can receive content for presentation on the display of the display device in a streaming arrangement (e.g., content is streamed from the event processing system 205 using a streaming protocol, etc.). Each broadcast receiver device 220 can include one or more location circuits, such as a global position system (GPS) circuit (e.g., a GPS receiver), which can provide a geographic location of the broadcast receiver device 220. The geographic location can be transmitted to the event processing system 205 to carry out the operations described herein.

In some implementations, to access the functionality of (e.g., communicate with, receive notifications, alerts, and content items from, etc.) the event processing system 205, the broadcast receiver device can login to the event processing system 205 using one or more identifiers of a player profile 255 (described in greater detail herein). In doing so, the broadcast receiver device 220 can receive content items, including notifications and alerts, that are related to the attributes of the player profile 255 that is used to access the functionality of the event processing system 205. For example, using the application executing on the broadcast receiver device 220, a player can enter one or more identifiers of a player profile 255, such as a username, a password, an e-mail address, a phone number, a personal identification number (PIN), a secret code-word, or device identifiers for use in a two-factor authentication technique, among others. In some implementations, to link a player profile 255 with the application executing on the broadcast receiver device 220, the application can transmit a request for a code (e.g., a unique code, a broadcast receiver device 220 identifier, a QR code, etc.) to the event processing system 205, which in response can provide the code to the application. The request can include an identifier of the broadcast receiver device 220, which the event processing system 205 can associate with the code. In some implementations, the event processing system 205 can generate the code based on the identifier of the broadcast receiver device 220 (e.g., a hash of the identifier using a hashing algorithm, etc.).

The application can then display the code at a display device in communication with the broadcast receiver device 220. A player can then provide the code as input to an application executing on a client device that is in communication with the event processing system 205. The application executing on the client device can communicate with the event processing system 205, and the player can use the application (e.g., via user input, etc.) to provide a request to the event processing system to associate the code with a particular player profile 255. The event processing system 205 can store the code, and the associated identifier of the broadcast receiver device 220, in association with the identified player profile 255, thereby registering the broadcast receiver device 220 with the player profile. When the event processing system 205 communicates with a registered broadcast receiver device 220, the attributes of the associated player profile 255 can be used in the content selection policies described herein. In some implementations, the event processing system 205 can apply one or more notification restriction policies to any notifications that would otherwise be transmitted to the broadcast receiver device 220 based on the attributes of the player profile associated with the broadcast receiver device 220.

Each of the client devices 280 can include at least one processor and a memory, e.g., a processing circuit. The memory can store processor-executable instructions that, when executed by processor, cause the processor to perform one or more of the operations described herein. The processor can include a microprocessor, an ASIC, a FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 280 can include one or more computing devices or servers that can perform various functions as described herein. The one or more client devices 280 can include any or all of the components and perform any or all of the functions of the computer system 100 described herein in conjunction with FIGS. 1A-1D. The client devices 280 can be, or can be similar to, the client devices 102 described herein above in conjunction with FIGS. 1A-1D.

Each client device 280 can include, but is not limited to, a mobile device, a laptop, a personal computer, or another type of computing device. Each client device 280 can be implemented using hardware or a combination of software and hardware. Each client device 280 can include a display or display portion. The display can include a display portion of a television, a display portion of a computing device, a graphical user interface (GUI), or another type of interactive display (e.g., a touchscreen, a display, etc.) and one or more input/output (I/O) devices (e.g., a mouse, a keyboard, digital keypad). The display can include one or more portions, for example, to display multiple in-game events as described herein. The display can include a touch screen displaying an application, such as the applications used to interact with the event processing system 205, as described herein. The display can include a border region (e.g., side border, top border, bottom border). In some implementations, the display can include a touch screen display, which can receive interactions from a player (e.g., a user of the client device, etc.).

The interactions can result in interaction data, which can be stored and transmitted by the processing circuitry of the client device 280. The interaction data can include, for example, interaction coordinates, an interaction type (e.g., click, swipe, scroll, tap, etc.), and an indication of an actionable object with which the interaction occurred. Each client device 280 can include an input device that couples or communicates with the display of each client device to enable a user to interact with and/or select one or more actionable objects as described herein. The display can enable interaction with one or more visual indications provided through the display of each client device 280, and responsive to an interaction (e.g., select, click-on, touch, hover), the client device 280 can generate an indication identifying a user input and/or selection of a wager, an in-game event, or an indication to participate in a bonus event, among others.

Each client device 280 can include or be identified by a device identifier, which can be specific to each respective client device 280. The device identifier can include a script, code, label, or marker that identifies a particular client device 280. In some implementations, the device identifier can include a string or plurality of numbers, letters, characters or any combination numbers, letters, and characters. In some embodiments, each client device 280 can have a unique device identifier. Each client device 280 can include a client application, which can be an application that communicates with the event processing system 205 to update the player profiles 255, as described herein. The application can include a web application, a server application, or a file. In some implementations, the application can include a local application (e.g., local to a client device 280), hosted application, SaaS application, virtual application, mobile application, and other forms of content. In some implementations, the application can include or correspond to applications provided by remote servers or third party servers. In some implementations, the application can access the player profiles 255, the interactions 260, the live events 265, or the content items 270, stored and maintained at the database 225. The client application can present one or more actionable objects in a user interface of the client application via the display of the client device 280. Such actionable objects can include selectable hyperlinks, buttons, graphics, videos, images, or other application features that generate a signal that is processed by the application executing on the respective client device 280.

In embodiments, one or more client devices 280 can establish one or more communication sessions between the event processing system 205 and the one or more client devices 280. The one or more communication sessions can each include a channel or connection between the event processing system 205 and the one or more client devices 280. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic. The client devices 280 can provide client device information to the event processing system 205, for example, as part of the interactions 260 as described herein. Each client device 280 can include one or more location circuits, such as a GPS circuit (e.g., a GPS receiver), which can provide a geographic location of the client device 280. The geographic location can be transmitted to the event processing system 205 to carry out the operations described herein.

Each of the client devices 280 can be computing devices configured to communicate via the network 210 to access information resources, such as web pages via a web browser, or application resources via a native application executing on a client device 280. When accessing information resources, the client device can execute instructions (e.g., embedded in the native applications, in the information resources, etc.) that cause the client devices to display application interfaces. The application interfaces can be, for example, application interfaces that present different types of configuration interfaces for player profiles 255 of the event processing system 205, such an interface to create a player profile 255, an interface to modify a player profile 255, an interface to create a viewing session, or an interface to join a viewing session.

The application interfaces can, in some implementations, cause the client device 280 to communicate with the event processing system 205. For example, the application can be used to transmit a request to create a player profile 255. The request to create a player profile 255 can include, for example, login credentials, other identifying information, identifiers of the client device 280, identifiers of one or more broadcast receiver devices 220 to associate with the player profile 255, or any other information related to player profiles 255 as described herein. In some implementations, the client device 280 can modify a player profile 255 to include an indication that one or more interactions 260 provided by the client device 220 should be shown on particular broadcast receiver device(s) 220. For example, and as described in greater detail herein, a client device 220 can transmit a request to enable one or more wagers, messages, notifications, or other information provided by the client device 220 to the event processing system 205 (e.g., as part of the one or more interactions 265, etc.) to be displayed by one or more broadcast receiver devices 220 in connection with live content (e.g., as shown in FIGS. 3A-3C).

The application can present or more user interface elements (e.g., check boxes, sliders, buttons, etc.) to a player that allow the player to select a type of interactions 260 to display at broadcast receiver devices 220 (e.g., wagers, messages, notifications, alerts, etc.), and at which broadcast receiver devices 220 the interactions 260 should be displayed (e.g., one or more identifiers of broadcast receiver devices 220, a selection indicating that broadcast receiver devices 220 close to the client device should display the interactions 260, etc.). In some implementations, if a corresponding configuration is present in the player profile 255 associated with a client device 280, the client device 280 can send wireless signals to the broadcast receiver devices 220 (e.g., via Bluetooth, Wi-Fi, near-field communication, etc.). The wireless signals can include information relating to the interactions 260 performed at the client device 280 (e.g., wagers, notifications, etc.). The broadcast receiver device 220 can receive the interactions via a wireless communications interface, and an application can display the interactions 260 in connection with broadcast content presented by the broadcast receiver device 220 (e.g., similar to the interactions 260 displayed as one or more content items 270 received from the event processing system 205, as described herein).

As described herein, a client device 280 and the event processing system 205 can exchange messages including information that causes information relating to wagers to be displayed on a display of the client device 280. The event processing system 205 can provide instructions to display wager interfaces at the client device 280. The interfaces can include one or more actionable objects (e.g., interactive user interface elements, etc.) that cause the client device 280 to transmit a request to place a wager on an identified live event. In some implementations, the requests can include an identifier of a player profile 255 used by the client device 280 to access the functionality of the event processing system 205, identifiers of one or more viewing sessions associated with the player profile 255, a wager amount, an identifier of the wager, or other information relevant to a wager. In some implementations, the client device can receive one or more content items 270 for presentation on the display of the client device 280. The wagers, and any notifications or messages transmitted by a client device 280 to the event processing system 205 can be stored as part of the interactions 260, as described herein.

The database 225 can be a computer-readable memory that can store or maintain any of the information described herein. The database 225 can maintain one or more data structures, which may contain, index, or otherwise store each of the values, pluralities, sets, variables, vectors, numbers, or thresholds described herein. The database 225 can be accessed using one or more memory addresses, index values, or identifiers of any item, structure, or region maintained in the database 225. The database 225 can be accessed by the components of the event processing system 205, or any other computing device described herein, via the network 210. In some implementations, the database 225 can be internal to the event processing system 205. In some implementations, the database 225 can exist external to the event processing system 205, and may be accessed via the network 210. The database 225 can be distributed across many different computer systems or storage elements, and may be accessed via the network 210 or a suitable computer bus interface.

The event processing system 205 can store, in one or more regions of the memory of the event processing system 205, or in the database 225, the results of any or all computations, determinations, selections, identifications, generations, or calculations in one or more data structures indexed or identified with appropriate values. Any or all values stored in the database 225 may be accessed by any computing device described herein, such as the event processing system 205, to perform any of the functionalities or functions described herein. In some implementations, the database 225 can be similar to or include the storage 128 described herein above in connection with FIG. 1C. In some implementations, instead of being internal to the event processing system 205, the database 225 can form a part of a cloud computing system. In such implementations, the database 225 can be a distributed storage medium in a cloud computing system, and can be accessed by any of the components of the event processing system 205 or any other computing devices described herein.

The database 225 can maintain or store one or more player profiles 255 associated with a player (e.g., a user) of a client device 280 (e.g., a smartphone, laptop, etc.) or a broadcast receiver device 220 (e.g., via the registration process described herein). The player profile 255 can be stored in association with one or more identifiers of a client device 280, or a broadcast receiver device 220 that is associated with the corresponding player. The player profile 255 can be a profile that includes information about a player, and information about one or more of the client devices or broadcast receiver device 220 used to access the event processing system 205 using the player profile 255. For example, identifiers of a player profile can be used to access the functionality of the event processing system 205. The identifiers can include a username, a password, an e-mail address, a phone number, a personal identification number (PIN), a secret code-word, or device identifiers for use in a two-factor authentication technique, among others. The player profile 255 can store information about, and be associated with, corresponding viewing sessions 260, interactions 265, content items, accessed broadcast content, associated live events, upcoming live events, fantasy sports lineups (e.g., identifiers of fantasy players, lineups, lineup configurations, fantasy games, and outcomes, etc.) that are performed via the event processing system 205 or computing devices associated with the event processing system 205.

In some implementations, the player profile 255 can store a credit balance, wager information (e.g., an amount of a wager, a timestamp associated with a wager, information about the presence of an indication to participate in a bonus opportunity using the wager, a client device identifier of a client device 280 that was used to place the wager, etc.). The player profile 255 can store information about a client device used to access the event processing system 205 such as an Internet Protocol (IP) address, a MAC address, a GUID, an player profile name (e.g., the name of a user of the client device 280, etc.), device name, among others. In some implementations, a player profile 255 can be created by the event processing system 205 in response to a player profile 255 creation request transmitted by a client device or a broadcast receiver device 220. The player profile creation request can include any of the player profile information described herein. The player profile 255 can include indications of current or ongoing wagers. For example, the player profile can include a list of identifiers of currently open wagers (e.g., the wager is placed, but the outcome is undetermined, etc.). As the outcome of each wager occurs, the player profile 255 can be updated to include the wager outcome. The player profile 255 can include a configuration setting indicating a type of interactions 260 to display at broadcast receiver devices 220 (e.g., wagers, messages, notifications, alerts, etc.), and at which broadcast receiver devices 220 the interactions 260 should be displayed (e.g., one or more identifiers of broadcast receiver devices 220, a selection indicating that broadcast receiver devices 220 close to the client device should display the interactions 260, etc.).

The database 225 can store or maintain one or more interactions 260 associated with each of the one or more player profiles 255, for example, in one or more data structures. As described herein, when a player interacts with a content item 270 (such as a notification or alert, one or more actionable objects, etc.) displayed in connection with broadcast content, the broadcast receiver device 220 (or the application executing thereon) can transmit interaction data to the event processing system 205 via one or more messages in a communication session. The interaction data can include, for example, a time of the interaction, an identifier of a content item 270 or other actionable object with which the player interacted, identifier(s) of broadcast content being viewed with the content item 270 or other actionable object, identifiers of a type of action (e.g., record, navigate to different broadcast content, place a wager, etc.) performed by the player via the interaction, values corresponding to any input information (e.g., wager amounts, etc.), wager type (e.g., over/under, prop bet, etc.) or any other information relating to an interaction performed by a player at the broadcast receiver device 220. The interactions 260 identify a wager placed by a player (e.g., via a client device 280 or a broadcast receiver device 220) can include any type of wager information. For example, the interactions 260 can include an amount of a wager placed on a live event, a type of the wager placed on the live event, an identifier of a live event on which the wager was placed, an identifier of the player profile 255 that is associated with the interaction 260.

The event processing system 205 can receive wager requests from the client devices 280 and the broadcast receiver devices 220. Upon receiving interaction data (e.g., which can include interaction data) from a client device 280 or a broadcast receiver device 220, the event processing system 205 can store the interaction data as part of the interactions 260, in association with the player profile 255 that the player is using to access the functionality of the event processing system 205. In some implementations, the event processing system 205 can store the interaction data in association with one or more identifiers of broadcast content identified in the interaction (e.g., broadcast content that the broadcast receiver device 220 was displaying at the time of the interaction, broadcast content that the broadcast receiver device 220 navigated to or from in response to the interaction, broadcast content that the broadcast receiver device 220 has scheduled to record in response to the interaction, etc.).

The database 225 can store or maintain live events 265, for example, in one or more data structures. The live events 265 can be a list of timestamp-associated identifiers of broadcast content provided by the broadcast provider system 215 to the broadcast receiver device 220. In some implementations, the live events 265 can be upcoming live events. The live events 265 can be accessed by a broadcast receiver device 220 associated with (e.g., registered to, etc.) a player profile 255. For example, in some implementations, when a broadcast receiver device 220 accesses broadcast content (e.g., provided by the broadcast provider system 215, etc.), the application executing on the broadcast receiver device 220 can transmit one or more identifiers of the accessed broadcast content to the event processing system 205 in one or more broadcast content messages. In some implementations, the broadcast content messages can be transmitted periodically, for example, to indicate an amount of time (e.g., a duration, etc.) that a broadcast receiver device 220 has accessed a particular stream of broadcast content.

In some implementations, the broadcast content messages can include a flag indicating whether a broadcast receiver device 220 has scheduled a recording for the broadcast content identified in the broadcast content messages. The broadcast content messages can include a timestamp corresponding to a time that the broadcast receiver device 220 accessed the broadcast content. In some implementations, the broadcast content messages can include other information about a broadcast receiver device 220, such as a geographic location (e.g., global positioning system coordinates, etc.) of the broadcast receiver device 220. The event processing system 205 can store an association between a detected live event 265, an identifier of the broadcast receiver device 220 (e.g., displaying a broadcast of the live event, or in some implementations displaying a different live event 265, etc.), and a geographic location of the broadcast receiver device 220. The event processing system 205 can utilize these associations to present content items in connection with live broadcast content at a broadcast receiver device 220 based on interactions performed by one or more client devices 280 that are proximate to the broadcast receiver device 220.

In some implementations, lists of current or upcoming broadcast content, and any corresponding live events, can be provided by the broadcast provider system 215 to the event processing system 205. The broadcast provider system 215 can provide the indications of broadcast content, for example, as part of a television programming schedule. The television programming schedule can provide an expected start time, an expected end time, or an expected duration of the live events corresponding to the broadcasts. In some implementations, the broadcast provider system 215 can provide one or more attributes of the live events. The attributes of the live events can include, for example, participants in the live events, a current score of the live events, or any other conditions of a live event (e.g., score for a quarter in a sporting event, points scored by a particular player in a sporting event, etc.). In some implementations, the broadcast provider device 215 can provide up-to-date attributes of one or more live events 265. In some implementations, the attributes of the live events 265 can be retrieved from one or more external sources (not pictured).

In some implementations, upon receiving an indication of a live event, the event processing system 205 can retrieve additional attributes (e.g., from a third-party data provider, from an internal database, from the broadcast provider system, etc.) of the broadcast content. The additional attributes can include, for example, identifiers of an event depicted in the broadcast content (e.g., a live event, a sporting event, etc.), and any information corresponding to the event (e.g., identifiers of one or more teams participating in the event, identifiers of one or more event players participating in the event, identifiers of one or more fantasy sports lineups, etc.). In addition, the additional information corresponding to the event can include information about a score (e.g., in the case of a sporting event, for one or more teams or event players, etc.), or information about a status of the event. The additional information corresponding to the event can include an event schedule, which can include an expected start time, an expected end time, or an expected duration of the broadcast content. The event processing system can store the additional information corresponding to the event as part of the corresponding entry in the historic live events 265. In some implementations, the event processing system 205 can continuously or periodically retrieve up-to-date attributes for each live event 265.

The database 225 can store or maintain one or more content items 270, for example, in one or more data structures. The content items 270 can include display instructions for the broadcast receiver devices 220 generated by the event processing system 205. In some implementations, the content items 270 can be stored in association with a corresponding player profile associated with a broadcast receiver device 220 to which the content item 270 was transmitted. The content items 270 can include any form of media, such as text, images, video, audio, or instructions to display images, video, or text, with broadcast content at a broadcast receiver device 220. The content items 270 can be stored in association with one or more tags, topics, or category identifiers that indicate the type of information provided by the content item 270. The content items 270 can each be stored in association with attributes of the content item, including information corresponding to events (e.g., sporting events, teams, score information, odds information for wagers, or other information relating to live events or wagering, etc.). In some implementations, one or more of the content items 270 can be transmitted to a client device 280, for example, in a notification or alert corresponding to a wager, a viewing session 260, or any other message described herein.

The content items 270 can have various presentation attributes. For example, images can include presentation attributes such as image height, image width, image format (e.g., BMP, PNG, JPEG, SVG, etc.), image bit-depth, and other image attributes. Presentation attributes for videos can include video duration, video codec, sound codec, and video resolution (e.g., width, height, etc.), closed captioning information (e.g., text content, etc.), among others. Presentation attributes for text can include font type-face, font size, text location, and other information. For example, a content item 270 can include instructions that cause the item of content item 270 to be presented on with broadcast content in connection with a second content item 270. In some implementations, the presentation attributes of the content item 270 can specify a relative position of the content item 270 when presented in the application executing at the broadcast receiver device 220. In some implementations, the content items 270 can include one or more fantasy sports contests, and can include attributes such as a sport category, a price parameter, a prize parameter, a registrant threshold, a registrant limit, a current registrant count, a day value, a time value, a duration value, a contest type, and an experience level.

The content items 270 can include instructions that allow the content items to include user interface elements (e.g., actionable objects, etc.). The user interface elements can include instructions that cause the broadcast receiver devices 220 to carry out one or more operations. For example, in some implementations, a content item 270 can include instructions that present a user interface element that, when interacted with, causes the broadcast receiver device 220 to navigate to different broadcast content provided by the broadcast provider system 215. In some implementations, a content item 270 can include instructions that present a user interface element that, when interacted with, causes the broadcast receiver device 220 to schedule a recording (e.g., store broadcast content locally in a memory of the broadcast receiver device, etc.) for broadcast content provided by the broadcast provider system 215. In some implementations, a content item 270 can include instructions that present a user interface element that, when interacted with, causes the broadcast receiver device 220 to transmit a request to place a wager on a live event identified by the content item.

The request to place the wager can include, for example, a wager amount and wager properties (e.g., type of wager, odds of wager, condition on which the wager was placed, etc.). Upon receiving the request to place the wager in response to an interaction with the content item, the event processing system 205 can store a record of the request as part of the interactions 260 in association with the player profile used to access the event processing system 205. Wagers or other interactions 260 placed using a participating player profile 255 can be displayed as one or more content items 270 at one or more broadcast receiver devices 220 identified by the event processing system 205, as described herein. In some implementations, the event processing system 205 can generate one or more of the content items 270 upon receiving an interaction 260 (e.g., generate a content item that includes a player name, a wager amount, a wager type, a condition on which the wager was placed, any other wager information as described herein, etc.).

Referring now to the operations of the event processing system 205, the profile maintainer 230 can maintain one or more player profiles 255, for example, in one or more data structures in the database 225. To do so, the profile maintainer 230 can store, remove, modify or otherwise access one or more player profiles 255. For example, the profile maintainer 230 can communicate with one or more client devices 280 via the network 210, or with one or more broadcast receiver devices 220, and receive one or more requests to create a player profile 255. The request to create a player profile 255 can include, for example, login credentials or other identifying information. In response to receiving the request, the profile maintainer 230 can generate a player profile 255 by allocating a corresponding region of memory in the database 225, and associating that region of memory with an identifier of the player profile 255. The profile maintainer 23 can then populate the region of memory with the login credentials and any other information received from the client device or the broadcast receiver device 220, as described herein.

For example, the profile maintainer 230 can store (e.g., in association with) one or more identifiers of a client device, or a broadcast receiver device 220, with the generated player profile 255. The player profile 255 can be populated by the profile maintainer 230 to include information about a player, and information about one or more of the client devices or broadcast receiver device 220 used to access the event processing system 205 using the player profile 255. The identifiers or login credentials can include a username, a password, an e-mail address, a phone number, a PIN, a secret code-word, or device identifiers for use in a two-factor authentication technique, among others. The profile maintainer 230 can store information about corresponding interactions 260, accessed broadcast content (e.g., as part of the live events 265), content items 270, associated live events, upcoming live events, or fantasy sports lineups (e.g., identifiers of fantasy players, lineups, lineup configurations, fantasy games, and outcomes, etc.), among others, which are performed via the event processing system 205 or computing devices associated with the event processing system 205 (e.g., the client devices or the broadcast receiver devices 220, etc.) in the player profile 255.

In some implementations, the profile maintainer 230 can store a credit balance or update a credit balance of the player in the player profile 255. The profile maintainer 230 can store wager information (e.g., an amount of a wager, a timestamp associated with a wager, information about the presence of an indication to participate in a bonus opportunity using the wager, a client device identifier of a client device that was used to place the wager, etc.) in the player profile, for example, and generate a corresponding interaction status 260 data structure for the wager. In some implementations, the profile maintainer 230 can store or update information relating to current or ongoing wagers performed by the player associated with the player profile 255 (e.g., wagers placed while the player is accessing the event processing system 205 using the player profile 255, etc.). For example, the profile maintainer 230 can store and update a list of identifiers of currently open wagers (e.g., the wager is placed, but the outcome is undetermined, etc.). Each ongoing or open wager can be stored in association with a respective live event 265. The profile maintainer 230 can store and update information about any client devices (e.g., including any broadcast receiver device 220, etc.) used to access the event processing system 205 with the player profile 255, such as an IP address, a MAC address, a GUID, a player profile name (e.g., the name of a user of the broadcast receiver device 220, etc.), device name, among others. As the outcome of each wager occurs, the profile maintainer 230 can update both the player profile 255 and the interaction status 265 corresponding to the wager with the wager outcome.

The interaction receiver 235 can receive one or more interactions (e.g., wagers, etc.) corresponding to a wagering opportunity of a live event 265 from one or more client devices 280. Wagering opportunities can be any type of wagering opportunity, and can be identified in the interactions received from the client devices 280. The client devices 280 can transmit wagers, for example, from an application executing at the client device 280. In some implementations, the interaction receiver 235 can provide one or more wagering options (e.g., opportunities on which a player may wager, etc.) for one or more ongoing or upcoming live events 265. The interaction receiver 235 can access the live events 265 to identify one or more upcoming or current (e.g., ongoing) live events 265, and access attributes of the live events 265 to determine one or more wager opportunities (e.g., via a lookup table using conditions or attributes of the live event 265, etc.).

The interactions 260 received by the interaction receiver 235 can include client device 280 information, such as information about a physical location of the client device 280. As described in greater detail herein, the event processing system 205 can utilize the location of one or more of the client devices 280 to identify a broadcast receiver device 220 on which to display a content item 270 indicating the interaction 260 transmitted by the one or more client devices. The interaction receiver 235 further receive additional information relating to displaying the interactions 260 as content items at broadcast receiver devices 220, such as an indication that a player does or does not want the interaction 260 (e.g., a wager) displayed by a broadcast receiver device 220, or an identifier of a broadcast receiver device 220 on which the interaction 260 should be shown, among others. The interactions 260 can each identify a corresponding live event 265 (e.g., a wager placed on an ongoing football game, etc.).

The broadcast device identifier 240 can identify a broadcast receiver device 220 that is presenting a broadcast of the live event. To do so, the broadcast device identifier 240 can access one or more of the live events 265, which can store information from the broadcast messages transmitted by the broadcast receiver devices 220 when accessing broadcast content. As described herein, the broadcast messages can include identifiers of the broadcast receiver devices 220 that transmitted the broadcast messages, and can include identifiers of live event broadcasts being displayed at the broadcast receiver devices 220. For a given live event 265, the broadcast device identifier 240 can access the live events 265 to identify the broadcast receiver devices 220 that are displaying the live event (e.g., by accessing the associations between the broadcast receiver devices 220 by live event identifier). In some implementations, to identify one or more broadcast receiver devices 220 displaying a given live event 265, the broadcast device identifier 240 can transmit a request for a list of broadcast receiver devices displaying the live event to the broadcast provider system 215. In response, the broadcast provider system 215 can provide a list of identifiers of broadcast receiver devices 220 displaying an identified live event 265.

In some implementations, the broadcast device identifier 240 can receive a request from a broadcast receiver device 220 for one or more content items 270 indicating interactions 260 (e.g., wagers, etc.) placed by client devices 220 that identify the live event currently displayed at the broadcast receiver device 220. The broadcast device identifier 240 can identify the requesting broadcast receiver device 220 as a device to which content items should be transmitted. Each of the broadcast receiver devices identified by the broadcast device identifier 240 can be identified as candidate broadcast receiver devices 220 for receiving content items 270 indicating one or more interactions 260 from client devices 280 associated with the broadcast receiver device 220 (e.g., via an association in a player profile 255, by proximate location, etc.).

In some implementations, upon identifying one or more broadcast receiver devices 220, the broadcast device identifier 240 can identify corresponding interactions 260 (e.g., wagers) received from client devices 280 that can be displayed with the broadcast of the live event 265 at the identified broadcast receiver devices 220. In some implementations, the broadcast device identifier 240 can identify client devices 280 that are proximate to each identified broadcast receiver device 220. As described herein, the broadcast device identifier 240 may receive indications of a physical location of identified broadcast receiver devices, and the event processing system 205 can receive location information of client devices 280, for example, in interactions 260 provided by the client devices 280. In some implementations, the broadcast device identifier 240 can identify locations of client devices 280 that transmitted interactions 260 based on a player profile 255 associated with the client device 280. The player profile 255 can indicate a physical location of the client device 280. The broadcast device identifier 240 can compare the physical location of the broadcast receiver device 220 displaying a live event 265 to the physical location of one or more client devices 280 that transmitted an interaction 260 identifying the live event 265. Interactions 260 from client devices 280 that are located within a predetermined distance of a broadcast receiver device 220 can be identified as an interaction 260 to display at the broadcast receiver device 220. The client devices 280 identified by the broadcast device identifier 240 are a subset of the client devices 280 communicating with the event processing system 205.

The instructions generator 245 can generate instructions for the identified broadcast receiver device(s) 220 that cause an application executing on the broadcast receiver device(s) 220 to display one or more content items 270 corresponding to any identified interactions 260. As described herein, client devices 280 that are associated with a broadcast receiver device 220 (e.g., an indication in a player profile 255, within a predetermined distance of the broadcast receiver devices 220, identified in an interaction 260, etc.) can provide one or more interactions 260 (e.g., wagers, notifications, messages, etc.), which can be displayed on the associated broadcast receiver devise 220. In some implementations, the instructions generator 245 can select one or more content items present with broadcast content at each identified broadcast receiver device 220, for example, based on the interactions 260 received from the client devices 280. For example, as described herein above, the event processing system 205 may generate one or more content items 270 corresponding to one or more interactions 260 (e.g., a content item 270 including information about a wager that is placed on a live event).

The instructions generator 245 can select content items 270 that are associated with a broadcast of a live event displayed at the broadcast receiver device 220. For example, the instructions generator 245 can select content items 270 associated with received interactions 260 identified by the broadcast device identifier 240 as corresponding to the live event. In some implementations, the instructions generator 245 can select content items 270 corresponding to interactions 260 that identify the live event displayed at the broadcast receiver device 220 and were transmitted by a client device 280 that is associated with that broadcast receiver device 220. For example, the client device 280 may be associated with a player profile 255 that identifies the broadcast receiver device 220, the interaction 260 from the client device 280 may identify the broadcast receiver device, or the client device 280 may be within a predetermined distance of the broadcast receiver device 220, among other associations.

In some implementations, the instructions generator 245 can generate display instructions for a broadcast receiver device 220 that does not satisfy a notification restriction condition. A notification restriction condition can be a setting that indicates notifications, such as the content items 270, should not be displayed at the broadcast receiver device 220. For example, the notification restriction condition can be a condition of a player profile 255 associated with the broadcast receiver device 220. In some implementations, the notification restriction condition can be a setting that is assigned to a broadcast receiver device 220 based on one or more attributes of the broadcast receiver device 220 (e.g., corresponding to one or more players that exhibit behavior indicating a gambling addiction, etc.).

In some implementations, the instructions generator 245 can modify one or more of the content items 270 as part of generating the instructions for the broadcast receiver device 220. For example, one or more identifiers (e.g., usernames, etc.) of the player profiles 255 associated with interactions 260 to which the content item 270 corresponds can be inserted into the content item 270. In some implementations, other information relating to the live event, or other wager information can be inserted into the content item 270 (e.g., live event name, wager amount, potential wager payout, channel identifier of broadcast, wager outcome, wager identifier, condition on which the wager was placed, etc.). In some implementations, the selected content items 270 can be ranked according to various attributes, and the rank can be used to designate an arrangement or order that the content items are to be presented. For example, the content items can be ranked based on recency of the detected outcome or change associated with the content item 270 (e.g., most recently updated first, least recently updated first, etc.). In some implementations, the instructions generator 245 can select one or more content items 270 in response to a request for up-to-date information (e.g., real-time content, near real-time content, etc.) received from a broadcast receiver device 220 or a client device 280). In response, the instructions generator 245 can identify one or more interactions 260 that identify the live event 265 being displayed at the broadcast receiver device 220.

In some implementations, responsive to identifying one or more client devices 220 that are associated with a broadcast receiver device, the instructions generator 245 can select the one or more content items 270 based on attributes of a player profiles 255 of the one or more client devices. For example, the instructions generator 245 can select content items that are similar to, or share attributes with, player profiles 255 that are associated with wagers that are recently placed on a live event displayed at the broadcast receiver device 220. In a non-limiting example, the selected content items 270 may be additional wagering opportunities for other live events that have attributes in common with player profiles 255 that are associated with wagers placed on the live event 265 displayed at the broadcast receiver device 220. In some implementations, the instructions generator 245 can determining a similarity score between the attributes of the player profiles 255 of the identified client devices 280 and content attributes of the content items 270. For example, content items 270 may identify one or more teams, sports, categories, players, wager types, or other types of attribute information. The player profiles 255 can identify similar attributes. To determine the similarity score, the instructions generator 245 can calculate a weighted sum (e.g., with predetermined weight values for each attribute) of the number of attributes in common between a player profile and a content item 270. A top number of content items 270 having the greatest similarity scores can be selected by the instructions generator 245 for presentation at the broadcast receiver device 220.

The instructions generator 245 can generate display instructions for the broadcast receiver device(s) 220 to display the selected content items 270, for example, in a determined or predetermined arrangement. The display instructions can include, for example, formatting instructions to position each of the content items 270 according to an arrangement (e.g., absolute or relative positions of the content items 270, an order of the content items 270 in a list, etc.). In addition, the instructions can include the selected content items 270 and an indication that the selected or generated content items are to be presented with a broadcast of the live event 265 displayed at the broadcast receiver device 220. As described herein above, the broadcast receiver devices 220 can receive broadcast content from a broadcast provider system 215, for example, via a proprietary broadcast network. In conventional broadcast systems, broadcast receiver devices 220 cannot display additional content according to customized arrangements or properties or attributes of the displayed broadcast content. The system 200 is an improvement over these conventional systems because the event processing system 205 can generate instructions that cause an application executing on the broadcast receiver device 220 to display selected or generated content items 270 according to a customized arrangement at the same time as broadcast content. In addition, the event processing system 205 provides the ability for corresponding content items 270 associated with a number of players to be displayed at a common broadcast receiver device 220, creating an integrated and social viewing experience.

Some examples of a display showing notifications, alerts, or other content items 270 being displayed in connection with broadcast content are depicted in FIGS. 3A, 3B, and 3C. Referring briefly now to FIG. 3A, depicted is a display 300A of a broadcast receiver device 220 (not pictured here) presenting content items 270 related to an interaction 260. As shown, a portion of the display 300A is dedicated to the broadcast content 310A, which here is shown as a basketball game. However, it should be understood that the broadcast content 310A could be any type of broadcast content, and need not necessarily be a basketball game. As shown in the left-hand pane of the display 300A, an application executing on the broadcast receiver device 220 is displaying an application interface 305A, which includes the selected content items 270 provided by the event processing system 205. The content items 270 are displayed in the application interface 305A as a list of content items, which each correspond to one or more potential wager opportunities. In addition, the application interface 305A can display a region dedicated to wagers players have placed on the live event shown in the broadcast content 310A, shown here as the player wagers 315. The content items 270 in the player wagers 315 region can be content items generated by the event processing system 205, for example, in response to receiving a corresponding interaction 260. The content items 270 shown in the player wagers 315 region can correspond to interactions 260 received from client devices 280 that are associated with the broadcast receiver device 220 displaying the broadcast content 310A.

FIG. 3B shows a similar display 300B of a broadcast receiver device 220 (not pictured here). As shown, a portion of the display 300B is dedicated to the broadcast content 310B, which here is shown as a football game. However, it should be understood that the broadcast content 310B could be any type of broadcast content, and need not necessarily be a football game. As shown in the left-hand pane of the display 300B, an application executing on the broadcast receiver device 220 is displaying an application interface 305B, which includes the selected content items 270 provided by the event processing system 205. The content items 270 are displayed in the application interface 305B as a list of content items, which are related to the viewing session 260 displayed at the broadcast receiver device 220. The application interface 305B can include a region dedicated to messages provided by players, for example, using one or more client devices 220 that identify the broadcast content 310A, shown here as the player messages 320. The content items 270 in the player messages 320 region can be content items 270 generated by the event processing system 205, for example, in response to receiving a corresponding interaction 260 that includes a message. The content items 270 shown in the player messages 320 can correspond to interactions 260 received from client devices 280 that are associated with the broadcast receiver device 220 displaying the broadcast content 310B.

Referring briefly now to FIG. 3C, depicted is a display 300C of a broadcast receiver device 220 (not pictured here). As shown, a portion of the display 300C is dedicated to the broadcast content 310C, which here is shown as a baseball game associated with a viewing session 260. However, it should be understood that the broadcast content 310C could be any type of broadcast content, and need not necessarily be a basketball game. As shown, the application overlay 305C includes the selected content items 270 provided by the event processing system 205. As shown, the application overlay 305C overlays a portion of the broadcast content 310C that is determined by the event processing system 205 to be uninteresting or otherwise unused. In some implementations, the application overlay 305C (or any other application interfaces described herein, etc.) can be semi-transparent, such that portions of the broadcast content 310C are still partially visible when the application overlay 305C is displayed by the application executing on the broadcast receiver device 220. In some implementations, a player can control the positon or size of the application interfaces described herein (e.g., including the application overlay 305C, etc.) via one or more input devices (e.g., a remote, a controller, a gamepad, a keyboard, a mouse, etc.). The application overlay 30CB can display content items 270 that identify wagers provided by client devices that are within a predetermined distance of the broadcast receiver device 220 displaying the broadcast content 310C.

Referring back now to FIG. 2, the instructions generated by the instructions generator 245 can be received, for example, by the broadcast provider system 215, and can include indications or identifiers of the broadcast receiver device(s) 220 identified by the broadcast device identifier 240. The instructions generator 245 can generate display instructions, which can be formatting instructions or other types of executable or computer-readable instructions that cause the broadcast receiver device 220 to display any of the application interfaces depicted in FIG. 3A, 3B, or 3C, among other display features, or content items 270 as described herein. The display instructions can include the content items 270, and one or more scripts that cause the content items 270 to be or to include actionable objects, as described herein. In some implementations, to generate the display instructions, the instructions generator 245 can utilize one or more templates corresponding to a type of content item 270 (e.g., a content item 270 that causes the broadcast receiver device 220 to place a wager on a live event, a content item 270 that causes the broadcast receiver device 220 to navigate to another broadcast, a content item 270 that causes the broadcast receiver device 220 to create or modify a fantasy sports lineup, display player identifiers of players player profiles, display messages associated with player profiles 255, display other information as described herein, etc.).

To generate the instructions, the instructions generator 245 can populate predetermined portions of the template with one or more of the selected content items 270. In some implementations, the instructions generator 245 can generate the instructions based on a determined type of broadcast receiver device 220. For example, a cable box may require a different type of instructions than a set top box or a cable-enabled television, or a cable box that receives a satellite signal via a satellite dish. To accommodate for different types of broadcast receiver devices 220, the instructions generator 245 can maintain sets of templates both for each content item type (e.g., types of interactions, types of content items 270 or media content, etc.) and for each type of broadcast receiver device 220.

The instructions communicator 250 can transmit the instructions to the broadcast receiver device(s) 220 to cause the application executing on the broadcast receiver device 22 to display the one or more content items 270 with the broadcast of the live event 265. In some implementations, the instructions communicator 250 can transmit the display instructions to the broadcast provider device 215. The instructions can include, for example, indications of the one or more broadcast receiver devices 220 that are to receive the display instructions. Upon receiving the display instructions from the instructions communicator, the broadcast provider system 215 can identify the one or more broadcast receiver devices 220 as indicated in the instructions, and transmit the display instructions to each of the destination broadcast receiver devices 220. The application executing on the broadcast receiver device(s) 220 associated with the viewing session 260 can receive the display instructions and identify the arrangement of the content items 270 to display with the live broadcast content. The application can then render the content items 270 in one or more application interfaces or overlays, such as those depicted in FIGS. 3A, 3B, and 3C. As described herein, the broadcast receiver device 220 or the client devices 280 can receive interactions from a player via one or more input devices, allowing for interaction with one or more actionable objects depicted as part of the content items 270. Upon detecting an interaction, the broadcast receiver device 220 (or the client devices 280) can parse or execute the display instructions for the selected content item to carry out the designated action (e.g., transmit a request to place a wager, navigate to other broadcast content, update a fantasy sports lineup, etc.). It should be understood that any other functionality as described herein can be carried out by the broadcast receiver device 220 via the application or the display instructions.

Figure 4:
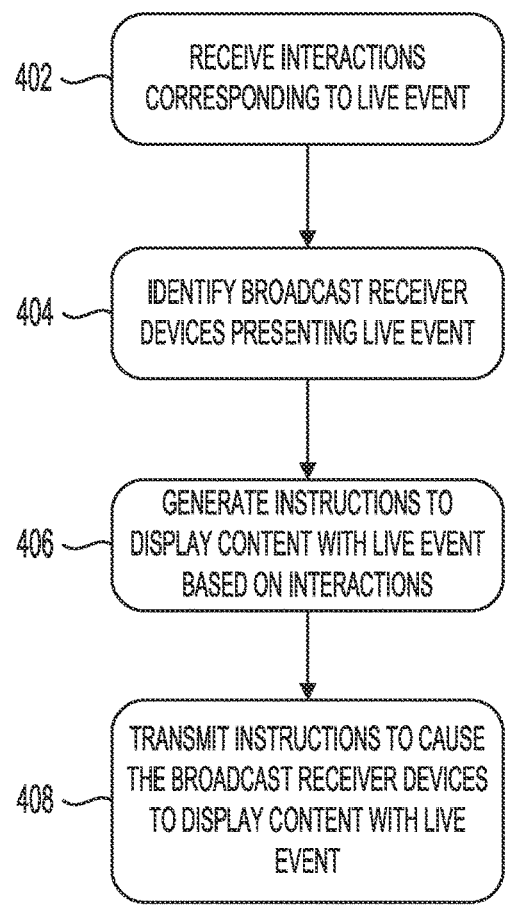
FIG. 4 illustrates an example flow diagram of a method for generating notification interfaces synchronized with broadcast events and local interactions, in accordance with one or more implementations.

Referring now to FIG. 4, depicted is an illustrative flow diagram of a method 400 for providing games having additional bonus features. The method 400 can be executed, performed, or otherwise carried out by the event processing system 205, the computer system 100 described herein in conjunction with FIGS. 1A-1D, or any other computing devices described herein. In brief overview of the method 400, the event processing system (e.g., the event processing system 205, etc.) can receive interactions (e.g., the interactions 265, etc.) corresponding to a live event (e.g., a live event 265) (STEP 402), identify one or more broadcast receiver devices (e.g., the broadcast receiver devices 220) presenting a broadcast of the live event (STEP 404), generate instructions to display one or more content items (e.g., the content items 270) with the broadcast of the live event (STEP 406), and transmit the instructions to cause the broadcast receiver devices to display the content with the broadcast of the live event (STEP 408).

In further detail of the method 400, the event processing system (e.g., the gaming system 205, etc.) can receive interactions (e.g., the interactions 265, etc.) corresponding to a live event (e.g., a live event 265) (STEP 402). The event processing system can receive one or more interactions (e.g., wagers, etc.) corresponding to a wagering opportunity of a live event from one or more client devices (e.g., the client devices 280). Wagering opportunities can be any type of wagering opportunity, and can be identified in the interactions received from the client devices. The client devices can transmit wagers, for example, from an application executing at the client device. In some implementations, the event processing system can provide one or more wagering options (e.g., opportunities on which a player may wager, etc.) for one or more ongoing or upcoming live events. The event processing system can access the live events to identify one or more upcoming or current (e.g., ongoing) live events, and access attributes of the live events to determine one or more wager opportunities (e.g., via a lookup table using conditions or attributes of the live event, etc.).

The interactions received by the event processing system can include client device information, such as information about a physical location of the client device. As described in greater detail herein, the event processing system 205 can utilize the location of one or more of the client devices to identify a broadcast receiver device on which to display a content item indicating the interaction transmitted by the one or more client devices. The event processing system further receive additional information relating to displaying the interactions as content items at broadcast receiver devices, such as an indication that a player does or does not want the interaction (e.g., a wager) displayed by a broadcast receiver device, or an identifier of a broadcast receiver device on which the interaction should be shown, among others. The interactions can each identify a corresponding live event (e.g., a wager placed on an ongoing football game, etc.).

The event processing system can identify one or more broadcast receiver devices (e.g., the broadcast receiver devices 220) presenting a broadcast of the live event (STEP 404). To do so, the event processing system can access one or more of the live events, which can store information from the broadcast messages transmitted by the broadcast receiver devices when accessing broadcast content. As described herein, the broadcast messages can include identifiers of the broadcast receiver devices that transmitted the broadcast messages, and can include identifiers of live event broadcasts being displayed at the broadcast receiver devices. For a given live event, the event processing system can access the live events to identify the broadcast receiver devices that are displaying the live event (e.g., by accessing the associations between the broadcast receiver devices by live event identifier). In some implementations, to identify one or more broadcast receiver devices displaying a given live event, the event processing system can transmit a request for a list of broadcast receiver devices displaying the live event to a broadcast provider system (e.g., the broadcast provider system 215). In response, the broadcast provider system 215 can provide a list of identifiers of broadcast receiver devices displaying an identified live event.

In some implementations, the event processing system can receive a request from a broadcast receiver device for one or more content items indicating interactions (e.g., wagers, etc.) placed by client devices that identify the live event currently displayed at the broadcast receiver device. The event processing system can identify the requesting broadcast receiver device as a device to which content items should be transmitted. Each of the broadcast receiver devices identified by the event processing system can be identified as candidate broadcast receiver devices for receiving content items indicating one or more interactions from client devices associated with the broadcast receiver device (e.g., via an association with a player profile (e.g., a player profile), by proximate location, etc.).

In some implementations, upon identifying one or more broadcast receiver devices, the event processing system can identify corresponding interactions (e.g., wagers) received from client devices that can be displayed with the broadcast of the live event at the identified broadcast receiver devices. In some implementations, the event processing system can identify client devices that are proximate to each identified broadcast receiver device. As described herein, the event processing system may receive indications of a physical location of identified broadcast receiver devices, and the event processing system can receive location information of client devices, for example, in interactions provided by the client devices. In some implementations, the event processing system can identify locations of client devices that transmitted interactions based on a player profile associated with the client device. The player profile can indicate a physical location of the client device. The event processing system can compare the physical location of the broadcast receiver device displaying a live event to the physical location of one or more client devices that transmitted an interaction identifying the live event. Interactions from client devices that are located within a predetermined distance of a broadcast receiver device can be identified as an interaction to display at the broadcast receiver device. The client devices identified by the event processing system are a subset of the client devices communicating with the event processing system.

The event processing system can generate instructions to display one or more content items (e.g., the content items 270) with the broadcast of the live event (STEP 406). The event processing system can generate instructions for the identified broadcast receiver device(s) that cause an application executing on the broadcast receiver device(s) to display one or more content items corresponding to any identified interactions. As described herein, client devices that are associated with a broadcast receiver device (e.g., an indication in a player profile, within a predetermined distance of the broadcast receiver devices, identified in an interaction, etc.) can provide one or more interactions (e.g., wagers, notifications, messages, etc.), which can be displayed on the associated broadcast receiver devise. In some implementations, the event processing system can select one or more content items present with broadcast content at each identified broadcast receiver device, for example, based on the interactions received from the client devices. For example, as described herein above, the event processing system may generate one or more content items corresponding to one or more interactions (e.g., a content item including information about a wager that is placed on a live event).

The event processing system can select content items that are associated with a broadcast of a live event displayed at the broadcast receiver device. For example, the event processing system can select content items associated with received interactions identified by the event processing system as corresponding to the live event. In some implementations, the event processing system can select content items corresponding to interactions that identify the live event displayed at the broadcast receiver device and were transmitted by a client device that is associated with that broadcast receiver device. For example, the client device may be associated with a player profile that identifies the broadcast receiver device, the interaction from the client device may identify the broadcast receiver device, or the client device may be within a predetermined distance of the broadcast receiver device, among other associations.

In some implementations, the event processing system can generate display instructions for a broadcast receiver device that does not satisfy a notification restriction condition. A notification restriction condition can be a setting that indicates notifications, such as the content items, should not be displayed at the broadcast receiver device. For example, the notification restriction condition can be a condition of a player profile associated with the broadcast receiver device. In some implementations, the notification restriction condition can be a setting that is assigned to a broadcast receiver device based on one or more attributes of the broadcast receiver device (e.g., corresponding to one or more players that exhibit behavior indicating a gambling addiction, etc.).

In some implementations, the event processing system can modify one or more of the content items as part of generating the instructions for the broadcast receiver device. For example, one or more identifiers (e.g., usernames, etc.) of the player profiles associated with interactions to which the content item corresponds can be inserted into the content item. In some implementations, other information relating to the live event, or other wager information can be inserted into the content item (e.g., live event name, wager amount, potential wager payout, channel identifier of broadcast, wager outcome, wager identifier, condition on which the wager was placed, etc.). In some implementations, the selected content items can be ranked according to various attributes, and the rank can be used to designate an arrangement or order that the content items are to be presented. For example, the content items can be ranked based on recency of the detected outcome or change associated with the content item (e.g., most recently updated first, least recently updated first, etc.). In some implementations, the event processing system can select one or more content items in response to a request for up-to-date information (e.g., real-time content, near real-time content, etc.) received from a broadcast receiver device or a client device). In response, the event processing system can identify one or more interactions that identify the live event being displayed at the broadcast receiver device.

In some implementations, responsive to identifying one or more client devices that are associated with a broadcast receiver device, the event processing system can select the one or more content items based on attributes of a player profiles of the one or more client devices. For example, the event processing system can select content items that are similar to, or share attributes with, player profiles that are associated with wagers that are recently placed on a live event displayed at the broadcast receiver device. In a non-limiting example, the selected content items may be additional wagering opportunities for other live events that have attributes in common with player profiles that are associated with wagers placed on the live event displayed at the broadcast receiver device. In some implementations, the event processing system can determining a similarity score between the attributes of the player profiles of the identified client devices and content attributes of the content items. For example, content items may identify one or more teams, sports, categories, players, wager types, or other types of attribute information. The player profiles can identify similar attributes. To determine the similarity score, the event processing system can calculate a weighted sum (e.g., with predetermined weight values for each attribute) of the number of attributes in common between a player profile and a content item. A top number of content items having the greatest similarity scores can be selected by the event processing system for presentation at the broadcast receiver device.

The event processing system can generate display instructions for the broadcast receiver device(s) to display the selected content items, for example, in a determined or predetermined arrangement. The display instructions can include, for example, formatting instructions to position each of the content items according to an arrangement (e.g., absolute or relative positions of the content items, an order of the content items in a list, etc.). In addition, the instructions can include the selected content items and an indication that the selected or generated content items are to be presented with a broadcast of the live event displayed at the broadcast receiver device. As described herein above, the broadcast receiver devices can receive broadcast content from a broadcast provider system 215, for example, via a proprietary broadcast network. In conventional broadcast systems, broadcast receiver devices cannot display additional content according to customized arrangements or properties or attributes of the displayed broadcast content. The method 400 is an improvement over these conventional systems because the event processing system can generate instructions that cause an application executing on the broadcast receiver device to display selected or generated content items according to a customized arrangement at the same time as broadcast content. In addition, the event processing system provides the ability for corresponding content items associated with a number of players to be displayed at a common broadcast receiver device, creating an integrated and social viewing experience.

The event processing system can transmit the instructions to cause the broadcast receiver devices to display the content with the broadcast of the live event (STEP 408). The event processing system can transmit the instructions to the broadcast receiver device(s) to cause the application executing on the broadcast receiver device to display the one or more content items with the broadcast of the live event. In some implementations, the event processing system can transmit the display instructions to the broadcast provider device. The instructions can include, for example, indications of the one or more broadcast receiver devices that are to receive the display instructions. Upon receiving the display instructions from the event processing system, the broadcast provider system can identify the one or more broadcast receiver devices as indicated in the instructions, and transmit the display instructions to each of the destination broadcast receiver devices. The application executing on the broadcast receiver device(s) associated with the viewing session can receive the display instructions and identify the arrangement of the content items to display with the live broadcast content. The application can then render the content items in one or more application interfaces or overlays, such as those depicted in FIGS. 3A, 3B, and 3C. As described herein, the broadcast receiver device or the client devices can receive interactions from a player via one or more input devices, allowing for interaction with one or more actionable objects depicted as part of the content items. Upon detecting an interaction, the broadcast receiver device (or the client devices) can parse or execute the display instructions for the selected content item to carry out the designated action (e.g., transmit a request to place a wager, navigate to other broadcast content, update a fantasy sports lineup, etc.). It should be understood that any other functionality as described herein can be carried out by the broadcast receiver device via the application or the display instructions.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the gaming system 205 can include clients and servers. For example, the gaming system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for generating notification interfaces synchronized with broadcast events and local interactions, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
   one or more processors coupled to non-transitory memory, the one or more processors configured to:
   receive, from a client device, a first wager request identifying first location information of the client device;
   responsive to the first wager request, identify a broadcast receiver device associated with second location information that is proximate to the first location information of the client device; and
   transmit instructions to the broadcast receiver device that cause the broadcast receiver device to present a content item identifying the first wager request with a broadcast.

2. The system of claim 1, wherein the first wager request identifies a first live event, and wherein the one or more processors are further configured to transmit the instructions responsive to determining that the broadcast receiver device is presenting a first broadcast of the first live event.

3. The system of claim 1, wherein the client device is associated with a player profile wherein the one or more processors are further configured to identify the broadcast receiver device upon determining that the player profile includes a configuration setting permitting presentation of wager requests with broadcasts of live events.

4. The system of claim 1, wherein the one or more processors are further configured to transmit the instructions responsive to determining that the broadcast receiver device satisfies a display condition.

5. The system of claim 1, wherein the content item comprises an actionable object that, when interacted with, causes the broadcast receiver device to present an interface corresponding to the first wager request.

6. The system of claim 1, wherein the client device is associated with a player profile, the one or more processors are further configured to select the content item from a plurality of content items based on the player profile.

7. The system of claim 1, wherein the one or more processors are further configured to:
   generate a second content item based on an outcome of the first wager request; and
   transmit second instructions to the broadcast receiver device to present the second content item with the broadcast.

8. The system of claim 1, wherein the one or more processors are further configured to transmit the instructions responsive to determining that the broadcast receiver device is associated with a setting that permits content items to be displayed at the broadcast receiver device with broadcast content.

9. The system of claim 1, wherein the one or more processors are further configured to:
   receive a request for content from the broadcast receiver device; and
   transmit the instructions to the broadcast receiver device responsive to the request for content.

10. The system of claim 1, wherein the content item comprises an actionable object that, when interacted with, causes the broadcast receiver device to navigate to a second broadcast associated with the first wager request.

11. A method, comprising:
    receiving, by one or more processors coupled to non-transitory memory, from a client device, a first wager request identifying first location information of the client device;
    responsive to the first wager request, identifying, by the one or more processors, a broadcast receiver device associated with second location information that is proximate to the first location information of the client device; and
    transmitting, by the one or more processors, instructions to the broadcast receiver device that cause the broadcast receiver device to present a content item identifying the first wager request with a broadcast.

12. The method of claim 11, wherein the first wager request identifies a first live event, and further comprising transmitting, by the one or more processors, the instructions responsive to determining that the broadcast receiver device is presenting a first broadcast of the first live event.

13. The method of claim 11, wherein the client device is associated with a player profile further comprising identifying, by the one or more processors, the broadcast receiver device upon determining that the player profile includes a configuration setting permitting presentation of wager requests with broadcasts of live events.

14. The method of claim 11, further comprising transmitting, by the one or more processors, the instructions responsive to determining that the broadcast receiver device satisfies a display condition.

15. The method of claim 11, wherein the content item comprises an actionable object that, when interacted with, causes the broadcast receiver device to present an interface corresponding to the first wager request.

16. The method of claim 11, wherein the client device is associated with a player profile, and further comprising selecting, by the one or more processors, the content item from a plurality of content items based on the player profile.

17. The method of claim 11, further comprising:
    generating, by the one or more processors, a second content item based on an outcome of the first wager request; and
    transmitting, by the one or more processors, second instructions to the broadcast receiver device to present the second content item with the broadcast.

18. The method of claim 11, further comprising transmitting, by the one or more processors, the instructions responsive to determining that the broadcast receiver device is associated with a setting that permits content items to be displayed at the broadcast receiver device with broadcast content.

19. The method of claim 11, further comprising:
    receiving, by the one or more processors, a request for content from the broadcast receiver device; and
    transmitting, by the one or more processors, the instructions to the broadcast receiver device responsive to the request for content.

20. The method of claim 11, wherein the content item comprises an actionable object that, when interacted with, causes the broadcast receiver device to navigate to a second broadcast associated with the first wager request.

\* \* \* \* \*